(12) United States Patent
Lye et al.

(10) Patent No.: US 9,046,390 B2
(45) Date of Patent: Jun. 2, 2015

(54) IMAGE SENSING METER READING PROBE

(71) Applicant: Greenwave Systems PTE. LTD., Singapore (SG)

(72) Inventors: Kong Wei Lye, Singapore (SG); Fu Kin Fong, Singapore (SG); Yee Fen Ching, Singapore (SG); William Diehl, Dove Canyon, CA (US); Sonny Windstrup, Singapore (SG)

(73) Assignee: Greenwave Systems PTE LTD, Singapore (SG)

( * ) Notice: Subject to any disclaimer, the term of this patent is extended or adjusted under 35 U.S.C. 154(b) by 0 days.

(21) Appl. No.: 14/162,263

(22) Filed: Jan. 23, 2014

(65) Prior Publication Data

US 2014/0139682 A1    May 22, 2014

Related U.S. Application Data

(63) Continuation of application No. PCT/US2012/048968, filed on Jul. 31, 2012.

(60) Provisional application No. 61/513,916, filed on Aug. 1, 2011.

(51) Int. Cl.
*G01D 9/42*  (2006.01)
*H04Q 9/00*  (2006.01)
*G01D 4/00*  (2006.01)

(52) U.S. Cl.
CPC .. *G01D 9/42* (2013.01); *H04Q 9/00* (2013.01); *H04Q 2209/60* (2013.01); *G01D 4/002* (2013.01)

(58) Field of Classification Search
CPC ............ H04Q 9/00; G01D 4/002; G01D 9/42

USPC .............................. 340/160, 870.02; 73/866.5
See application file for complete search history.

(56) References Cited

U.S. PATENT DOCUMENTS 4,652,855 A    3/1987 Weikel
4,782,706 A    11/1988 Kister
(Continued)

FOREIGN PATENT DOCUMENTS

WO    2010100392 A1    9/2010
WO    2013019790 A2    2/2013

OTHER PUBLICATIONS

Korean Intellectual Property Office, International Search Report and Written Opinion for International Patent Application PCT/US2012/048958, Jan. 29, 2013, Republic of Korea.
(Continued)

*Primary Examiner* — Jay Au Patel
*Assistant Examiner* — Neil Mikeska
(74) *Attorney, Agent, or Firm* — Bruce A. Young

(57) ABSTRACT

An apparatus to monitor one or more utility meters includes a communication unit with a processor, a communication interface coupled to the processor, and a probe interface coupled to the processor. A meter monitoring probe that includes a probe head is coupled by a cable to a probe connector capable to mate with the probe interface. The probe head includes an image sensor, an indicator, and a button. The probe head is capable to detect a characteristic of a utility meter that is dependent on a usage of a utility metered, and send information related to the characteristic to the processor. The processor is capable to receive the information from the probe head and send a message related to the usage of the utility over the communication interface, and the image sensor is capable to capture an image in response to a press of the button.

24 Claims, 19 Drawing Sheets

(56) References Cited

U.S. PATENT DOCUMENTS

| | | |
|---|---|---|
| 4,803,632 A | 2/1989 | Frew et al. |
| 4,904,995 A | 2/1990 | Bonner et al. |
| 4,963,820 A | 10/1990 | Medlin |
| 5,162,725 A | 11/1992 | Hodson et al. |
| 5,270,704 A | 12/1993 | Sosa et al. |
| 5,735,792 A | 4/1998 | Vanden Hoek et al. |
| 5,748,104 A | 5/1998 | Argyroudis et al. |
| 5,754,722 A | 5/1998 | Melling |
| 5,790,432 A | 8/1998 | Morys |
| 6,118,520 A | 9/2000 | Harner |
| 6,150,955 A | 11/2000 | Tracy et al. |
| 6,208,266 B1 * | 3/2001 | Lyons et al. ............. 340/870.02 |
| 6,236,880 B1 | 5/2001 | Raylman et al. |
| 6,369,719 B1 | 4/2002 | Tracy et al. |
| 6,429,649 B1 | 8/2002 | Boynton et al. |
| 6,429,671 B1 | 8/2002 | Duckworth et al. |
| 6,686,731 B2 | 2/2004 | Tacconi |
| 6,734,658 B1 | 5/2004 | Bierer |
| 6,928,948 B1 | 8/2005 | Shannon |
| 6,956,500 B1 | 10/2005 | Ducharme et al. |
| 7,043,380 B2 | 5/2006 | Rodenberg, III et al. |
| 7,174,260 B2 | 2/2007 | Tuff et al. |
| 7,793,545 B2 | 9/2010 | Mayou et al. |
| 8,126,665 B1 | 2/2012 | Whitson |
| 2002/0118119 A1 | 8/2002 | Hammond |
| 2003/0076241 A1 | 4/2003 | Middleton |
| 2004/0032504 A1 | 2/2004 | Shan et al. |
| 2004/0201450 A1 | 10/2004 | Samburg et al. |
| 2005/0104576 A1 | 5/2005 | Chang |
| 2006/0036967 A1 * | 2/2006 | Crichlow ...................... 715/781 |
| 2006/0161396 A1 | 7/2006 | Kagan |
| 2007/0063715 A1 | 3/2007 | Cannon et al. |
| 2007/0171092 A1 * | 7/2007 | Allgood ................... 340/870.02 |
| 2007/0200573 A1 | 8/2007 | Chen et al. |
| 2008/0098628 A1 | 5/2008 | Geitner |
| 2008/0264877 A1 | 10/2008 | Davis |
| 2010/0054747 A1 | 3/2010 | Houck et al. |
| 2010/0199747 A1 | 8/2010 | Barna et al. |
| 2010/0234733 A1 | 9/2010 | Wahlheim |
| 2011/0303311 A1 | 12/2011 | Klicpera |
| 2013/0213156 A1 | 8/2013 | Scholten |
| 2014/0055283 A1 | 2/2014 | Ching et al. |
| 2014/0139682 A1 | 5/2014 | Lye et al. |

OTHER PUBLICATIONS

USPTO, Notice of Allowance for U.S. Appl. No. 14/068,160, Sep. 22, 2014.

\* cited by examiner

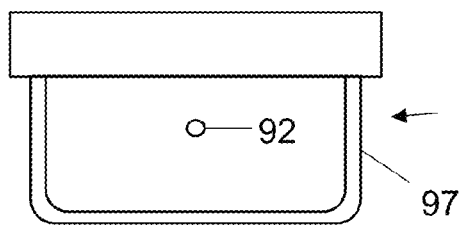
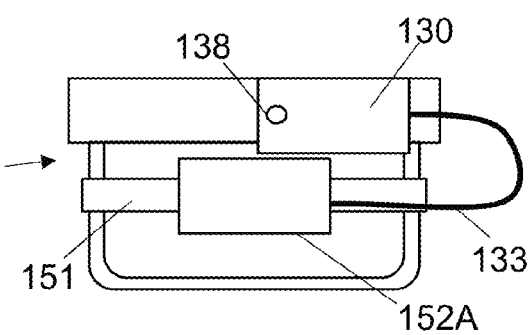
FIG. 3B　　　　　　　FIG. 3D
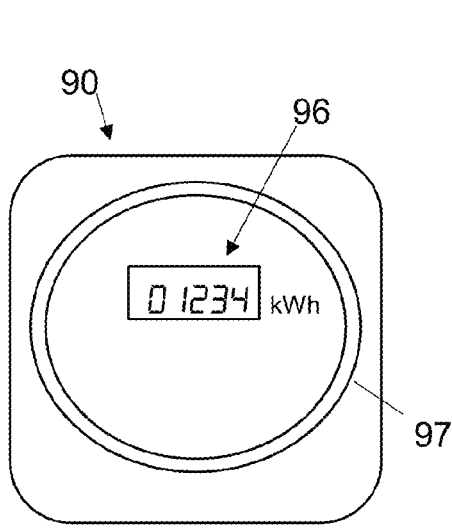
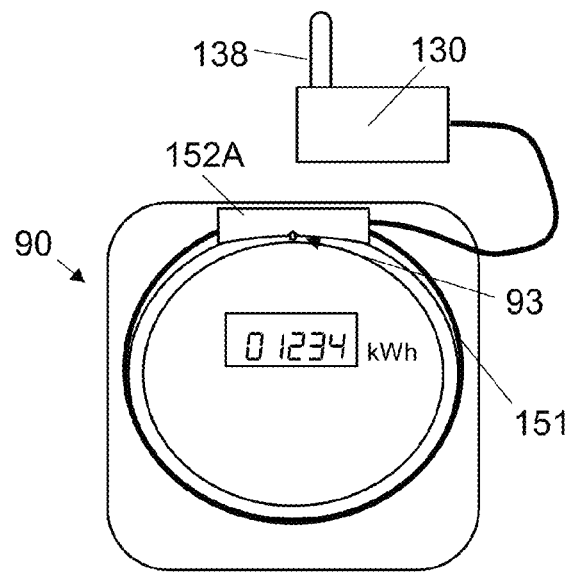
FIG. 3C　　　　　　　FIG. 3E

IMAGE SENSING METER READING PROBE

CROSS-REFERENCE TO RELATED APPLICATIONS

This application is a continuation of International Patent Application No. PCT/US2012/048968 entitled "MULTIPLE AND INTERCHANGEABLE METER READING PROBES" filed on Jul. 31, 2012, which claims priority to U.S. Provisional Patent Application No. 61/513,916 entitled "MULTIPLE AND INTERCHANGEABLE METER READING PROBES" filed on Aug. 1, 2011. The entire contents of both aforementioned applications are hereby incorporated by reference.

TECHNICAL FIELD

The present subject matter relates to metering of utility usage. In particular, it relates to detecting the current meter value of one or more utility meters.

BACKGROUND

Various utility services, such as electrical power, natural gas, and water, are commonly delivered to homes and businesses as a commodity and then billed to the consumer of the utility based on their usage of the utility. The usage of the utility is typically measured by a utility meter that is commonly on the premises of the consumer and monitors the transfer of the commodity from the utility provider to the consumer in real time.

Standard meters that are commonly used may measure the transfer of the commodity using methods that are applicable to the particular utility. So, for example, an electrical meter may measure the magnetic flux of the current flowing through a conductor, the voltage across the mains, the voltage drop across a low resistance in series with the load, or any combination of those, or other, methods. A gas or water meter may use a mechanical flow meter or use a pitot tube to measure the flow velocity. Standard meters, historically, have included a display of some sort that was readable by a human being. A "meter reader" would then make periodic visits to the meter to determine the current meter value which could then be used to bill the consumer. In the last decade or two, it has become common for a standard meter to provide some kind of signal that could be machine readable at a short distance so that a meter reader would only need to get within a certain distance to read the meter value. These meters could be read by simply driving down the street or pulling in the driveway, and use a variety of technologies, such as radio frequency (RF) identification (ID) tag technology and short range RF communication protocols. But standard utility meters may not provide more advanced usage-related data, such as costs and usage profiles over time.

Utility meters have emerged in recent years that may provide more advanced usage data and may have more advanced communication capabilities. Such meters may connect to a wide area network (WAN) to communicate directly to the utility provider's network, or a third party WAN, such as a third generation (3G) cellular data network, to provide connectivity to the utility provider. In some cases, the advanced utility meters may connect to a home area network (HAN) or local area network (LAN) and may allow a consumer to access the advanced usage data from the utility meter. In some cases, the advanced utility meter may still connect to the utility provider though a provider network or public WAN, in addition to its connection to the HAN/LAN. Advanced utility meters are being deployed by some utility providers in some geographic areas, but much of the existing infrastructure is still using standard meters.

BRIEF DESCRIPTION OF THE DRAWINGS

The accompanying drawings, which are incorporated in and constitute part of the specification, illustrate various embodiments. Together with the general description, the drawings serve to explain various principles. In the drawings:

FIGS. 3B and 3C show a top view and front view of another type of standard utility meter;

FIGS. 3D and 3E show a top view and front view of an alternative embodiment of a meter monitor attached to the other type of standard utility meter;

DETAILED DESCRIPTION

Figure 1A:
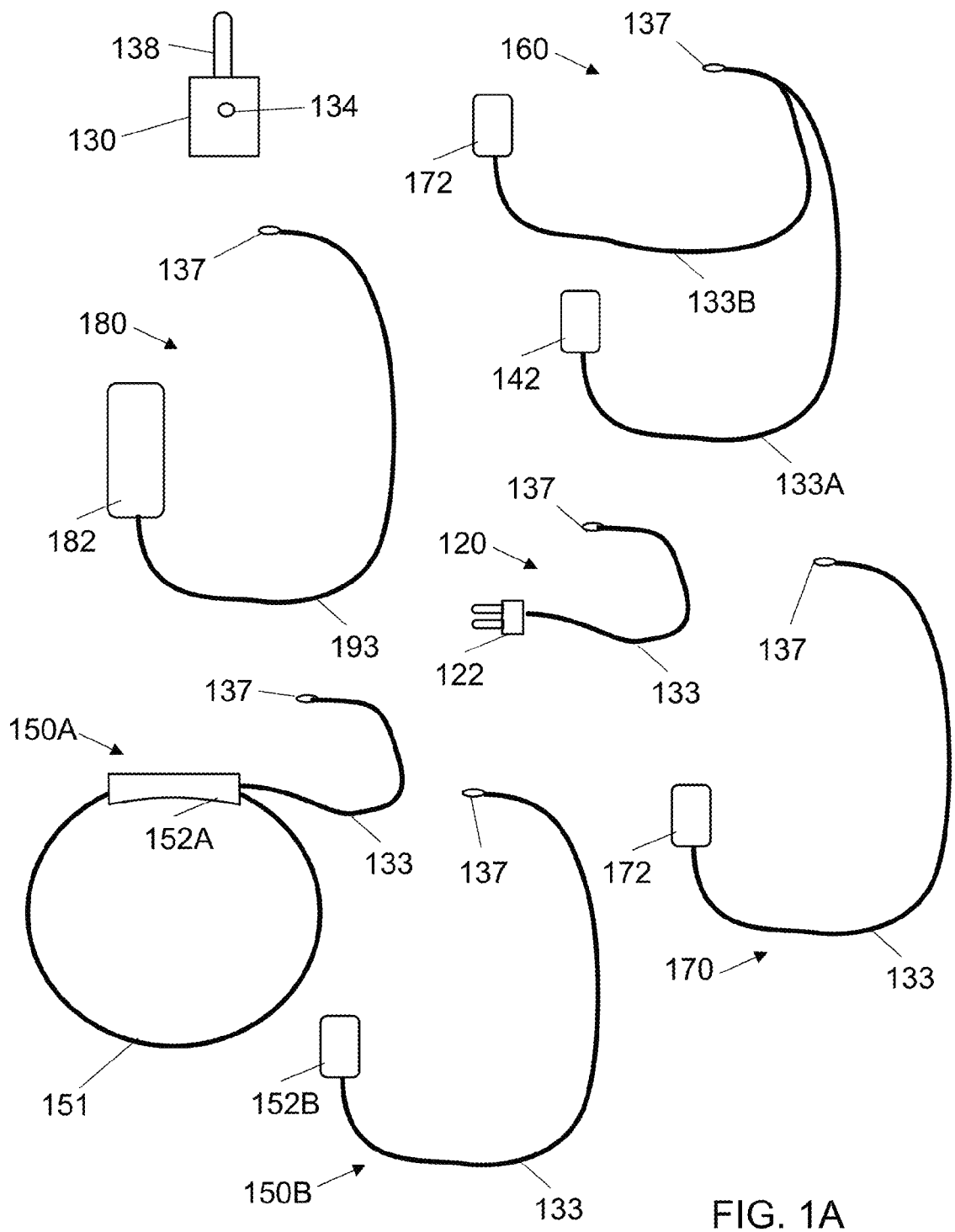
FIG. 1A shows an embodiment of a meter monitoring device with a plurality of different embodiments of meter monitoring probe assemblies.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

A "Home Area Network (HAN)" is a network within a single family's dwelling, such as a single family home or an apartment. The HAN may be homogeneous, using only one type of networking, or heterogeneous, using two or more types of networking, including, but not limited to: wired, such as Ethernet or other Institute of Electrical and Electronics Engineers (IEEE) 802 wired standards; wireless, such as Z-Wave®; IEEE 802.11a/b/g/n or other IEEE 802 wireless standards, such as 802.15.4 Zigbee®, or power line communications, such as HomePlug® or INSTEON® networks. In many contexts, a local area network (LAN) may be synonymous with a HAN and the terms may be used interchangeably.

A "utility" is a commodity that may be provided to a household, business, or other entity, which may be monitored, or metered, to determine an amount of the utility used or consumed. Utility usage is often measured using a utility meter. Examples of a utility include, but are not limited to, electrical power, water, natural gas, fuel oil, steam, and sewer.

A "standard utility meter" is a meter capable of measuring an amount of a utility that is used but is not capable of proving usage information over a HAN. A standard utility meter may have the capability to be monitored remotely by a connection to a WAN, short range RF communication, or other methods.

A "pulse" emitted by a utility meter, as used herein in the specification and claims, refers to any type of output that may indicate a certain amount of a utility has been transferred. Examples of a pulse include, but are not limited to, an emitted light that may be infrared, visible, or ultraviolet with a limited "on" duration or toggles between on and off, an electrical waveform with at least two states sent on a wire connected to the utility meter where the pulse may be incorporated as a baseband or modulated signal, a reflected light from a rotating high contrast device, a modulated magnetic field, a radio frequency signal that may be modulated using any method to incorporate the pulse indication, an acoustic signal, or any other method. One particular method of sending a pulse is to send a time stamp as a pulse to indicate a time of each occurrence that the certain amount of the utility has been transferred.

Reference now is made in detail to the examples illustrated in the accompanying drawings and discussed below.

FIG. 1 shows a meter monitoring device that includes a communication unit 130 with a plurality of different meter monitoring probes that may be coupled to the communication unit 130 to monitor one or more utility meters. The communication unit 130 may include an antenna 138 useful for communicating with at least one other device, although some embodiments may include a wired communication link in place of or in addition to the wireless connection. The communication unit 130 may be weatherized to allow it to be installed outdoors in some embodiments. The communication unit 130 may have a connector 134 for accepting one or more meter monitoring probes. The connector 134 may be included as a part of a probe interface. In many embodiments, the connector 134 may be a weatherproof connector capable of proper operation in a variety of environmental conditions, such as may be encountered in an outdoor installation. In some embodiments, the connector 134 may be a simple user accessible connector, but in other embodiments, the connector 134 may require some disassembly of the communication unit 130 to provide access to the connector 134. The communication unit 130 may be battery powered in some embodiments, while in other embodiments, it may be wired to a power source. Some embodiments may have two or more connectors 134, to allow more than one meter monitoring probe to be installed. The communication unit 130 may include one or more mounting options including, but not limited to, magnetic, mounting holes, adhesive, hook-and-loop material, straps, clips and hooks.

The communication unit 130 may include an integral external antenna 138 as shown in some embodiments. In other embodiments, an internal antenna, such as a patch antenna or a printed circuit antenna may be included inside the communication unit 130. In some embodiments, an external antenna connector may be included to allow a more specialized antenna to be attached (e.g. a directional antenna or a high gain antenna), or an antenna lead to be connected to allow the antenna to be mounted in a more advantageous position than the communication unit 130 itself.

Various embodiments may include one or more meter monitoring probes including, but not limited to one or more of the meter monitoring probes 150A/B, 160, 170, 180, 120 shown in FIG. 1A. In one embodiment, a light detecting meter monitoring probe 150A, 150B may be included. Various meter monitoring probes may have different form factors for use on different types of meters. Light detecting meter monitoring probe 150A includes a probe head 152A shaped to fit on the top of a cylindrical meter and includes a strap 151 for attaching the probe head 152A to the meter. A probe cable 133 and probe connector 137 for mating to the connector 134 of the communication unit 130 may also be included. Although the probe cable 133 may be of any length, in some embodiments the probe cable 133 may be short, such as about 1 meter long or less, with other embodiments having a probe cable 133 that is no more than about 3 meters long. In some embodiments, the cable 133 may be at least about 300 centimeters (cm) long to allow for more flexible positioning of the communication unit 130 away from the meter. Light detecting meter monitoring probe 150B may have the same electronics as probe 150A but with the probe head 152B shaped differently so that it can be adhesively attached over the light emitting diode (LED) of the meter. The use of the light detecting meter monitoring probe 150A is shown in more detail in FIG. 3A-E.

Other embodiments may include a wired connection to the meter using an S0 or P1 protocol, such as meter monitoring probe 120 with meter connector 122 that is capable of connecting to a wired output of the utility meter, such as a meter supporting an S0 interface or a P1 interface. Probe 120 may also include a probe cable 133 and probe connector 137. Other embodiments may include a magnetic detecting meter monitoring probe 170 that includes a magnetic reed sensor, or other magnetic field sensor, in the probe head 172 that is connected to the probe cable 133 and probe connector 137. The use of the magnetic detecting meter monitoring probe 170 is shown in more detail in FIG. 4.

In some embodiments, a multi-headed meter monitoring probe may be included, such as the electric/gas meter monitoring probe 160. The multi-headed probe 160 may have a single probe connector 137 coupled to multiple probe cables with individual probe heads. In the example shown, multi-headed probe 160 has probe cable 133A connected to the reflected light probe head 142 that may be suitable for monitoring many electrical meters, and probe cable 133B connected to magnetic detecting probe head 172 that may be suitable for monitoring many different typed of gas meters. In at least some embodiments, the probe cable 133A and/or the probe cable 133B may be no more than about 3 meters long. This use of this electric/gas meter monitoring probe 160 is shown in more detail in FIG. 8.

Other embodiments may include an image capture meter monitoring probe 180 that includes a camera or other image capture device in the probe head 182 connected to the probe cable 193 and probe connector 137. The use of the image capture meter monitoring probe 180 is shown in more detail in FIG. 9A-9D.

A wide variety of meter monitoring probes may be included in addition to those described above, including, but not limited to, meter monitoring probes using an inductive clamp to measure electrical current flow, a light emitting and reflectance measuring probe, a probe using an ultrasonic flow meter to measure fluid flow in a pipe, a probe using a Hall effect sensor to detect magnetic flux, a probe using a microphone to detect acoustical output from the meter, or any other method of detecting a characteristic of the utility meter that depends on the amount of the utility measured by the meter.

Various types of utility meters may be monitored, including electrical meters, gas meters, water meters, or other types of utility meters. Although there are a wide range of types of meters for each utility, some types of meter output are more common than others for each type of meter. Electrical meters may often have a spinning disc that may be monitored by the light emitting, reflectance measuring probe head 142. Many electrical meters may include a pulsed LED that may be monitored using a light detecting probe head 152. Other electrical meters may require an image sensing probe head 182, a wired connection probe 120 for an S0 or P1 connection or inductive clamps on the main power feeds.

A probe using an inductive clamp measures current that is generated by a magnetic coil that loops around the electrical line and is not dependent on interfacing with an existing meter. While this method of measurement may provide a high degree of precision, they may be difficult to install and may be costly. They are also not conducive to a low operating power as might be required for battery operation. A probe using an inductive clamp may include circuitry to measure the output of the magnetic coil in the probe head in some embodiments while other embodiments may include the circuitry in the communication unit 130.

Gas meters often have a mechanical counter as their output using one wheel imprinted with numbers for each digit. In many cases, the wheel representing the least significant digit may have a magnet embedded at one spot in the wheel. This allows a magnetic detection probe head 172 using a magnetic detection sensor, such as a magnetic reed or Hall effect sensor to be used with many gas meters. Other gas meters may support a P1 wired connection and an image sensing probe head 182 but others may require an ultrasonic flow detector. Water meters also often use a mechanical counter but may be less likely to embed a magnet in the least significant digit wheel. Nonetheless, water meters may often be monitored using similar probe heads as gas meters. Some meters may also emit an acoustic click that may be monitored using a probe head incorporating a microphone.

A probe using an ultrasonic flow detector measures echo delays in waves reflected from the material flowing through the pipe. Such sensors may be mounted on the outside of a pipe and do not depend on interfacing with an existing meter, but they may be configured and calibrated based on the pipe material and diameter. A probe using an ultrasonic flow detector may include circuitry to measure the reflection delay in the probe head in some embodiments while other embodiments may include the circuitry in the communication unit 130.

The connector 134 of the communication unit 130 may be a universal connector supporting several different types of probe heads in some embodiments. In other embodiments, the connector 134 may have various subsections for different types or numbers of probe heads. In one embodiment, the connector 134 may have a common ground with a single conductor or pair of conductors for each probe head that may be simultaneously connected. Depending on the probe head, the conductor or conductor pair may be used as a simple on/off pulse indication, such as might be output by a light detection probe head 150 or a S0 connector, or it might be used as a more sophisticated communication protocol for communicating more robust data, such as image data from a camera or a P1 wired interface. Communications protocols may include, but should not be limited to, M-Bus, universal serial bus (USB), RS-232, I$^2$C, 12S, or other clocked, self-clocked, or asynchronous protocols. The communication unit 130 may determine the type of communication being done by each probe head and configure itself appropriately to properly receive data from each probe head.

The communication unit 130 may communicate with a wireless network or HAN with one or more other devices in a home or business using antenna 138. Depending on the type of network supported, various methods may be used to pair the communication unit 130 with a particular wireless network or other wireless device. In some embodiments, the communication unit 130 may be pre-configured to communicate with another device that is bundled with it at the point of sale or in the factory. In other embodiments, the communication unit 130 may include a button to press or other mechanism for pairing it with another device. The communication unit 130 may be capable of communication over any type of wireless network, such as IEEE 802.11 Wi-Fi, IEEE 802.15.4 Zigbee, Z-Wave, or other networks using radio frequency communication, depending on the embodiment. Some embodiments may communicate over a wired network in addition to or in place of the wireless network and other embodiments may communicate using power line communication techniques.

Figure 1B:
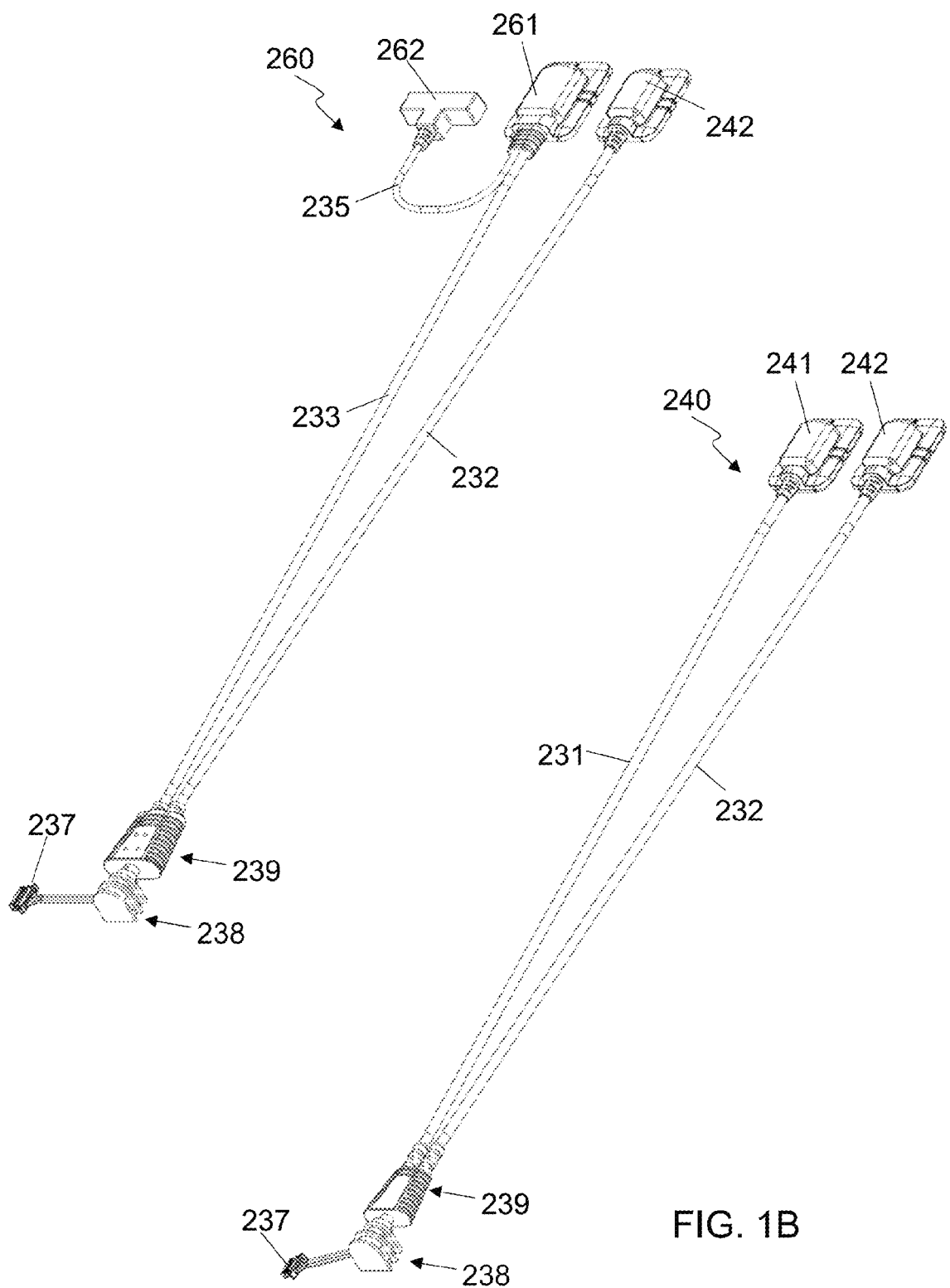
FIG. 1B shows additional embodiments of meter monitoring probe assemblies.

FIG. 1B shows additional embodiments of meter monitoring probe assemblies 240, 260. A dual optical head probe assembly 240 may be useful for monitoring two separate utility meters. The first optical head 241 may be attached to a first meter that either emits pulses of light or has a characteristic that allows for a change in reflected light. The second optical head 242 may be attached to a second meter that either emits pulses of light or has a characteristic that allows for a change in reflected light. In some embodiments, the first meter and the second meter may both be electrical meters. In another embodiment, the first meter may be an electric meter and the second meter may be a gas or water meter. The first and second meters may be any kind of utility meter. The dual optical head probe assembly 240 may include a probe connector 237 to mate with the connector 134 of the communication unit 130. A cable weatherproofing assembly 238 may help seal the opening of the communication unit 130 where the probe assembly 240 exits. A strain relief 239 may help eliminate stress points of the cables 231, 232 where they exit the communication unit 130. The first probe cable 231 couples the first optical head 241 to the probe connector 237 and the second probe cable 232 couples the second optical head 242 to the probe connector 237. Various wires within the first probe cable 231 and second probe cable 232 may connect to shared pins on the probe connector 237 and other wires may have separate pins on the probe connector 237, depending on the embodiment. Depending on the embodiment, the first optical probe head 241 and the second optical probe head 242 may be similar to the probe head 142 of FIG. 2A, probe head 152 of FIG. 3A, probe head 342 of FIG. 5, or may be implemented differently than those probe heads. The two probe heads 241, 242 may both be the same, or may be different in either their form factor and/or specific function. If the functions are different, the two probe heads 241, 242 may be responsive to different wavelengths of light, may or may not have a light emitter, or may be different in some other way.

Figure 7:
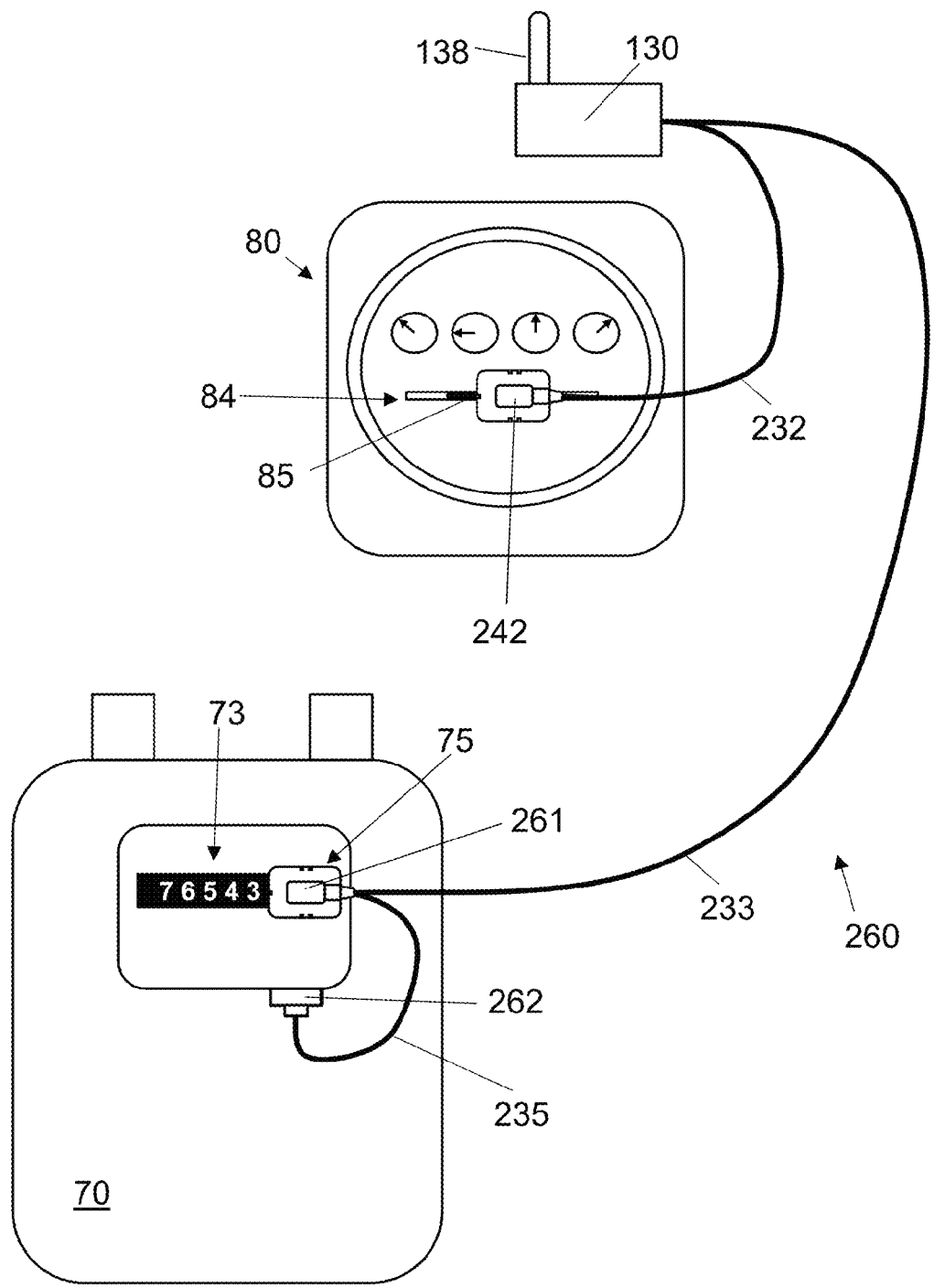
FIG. 7 shows an embodiment monitoring two utility meters.

An electric/gas meter probe assembly 260 may utilize a similar probe connector 237, weatherproofing assembly 238, strain relief 239, second probe cable 232, and second optical probe head 242 as the dual optical probe assembly 240 in some embodiments. The first probe cable 233 may couple the gas optical head 261 to the probe connector and may be similar to the first probe cable 231 of the probe assembly 240, although some embodiments may have additional conductors. The gas optical head 261 may be similar to one of the probe heads 241, 242 of the probe assembly 240, but may include a secondary cable 235 that couples the gas optical head 261 to the gas magnetic head 262. The gas magnetic head 262 may be similar to the probe head 172 of FIG. 4. An application of the electric/gas meter probe assembly 260 is shown in FIG. 7.

Figure 2A:
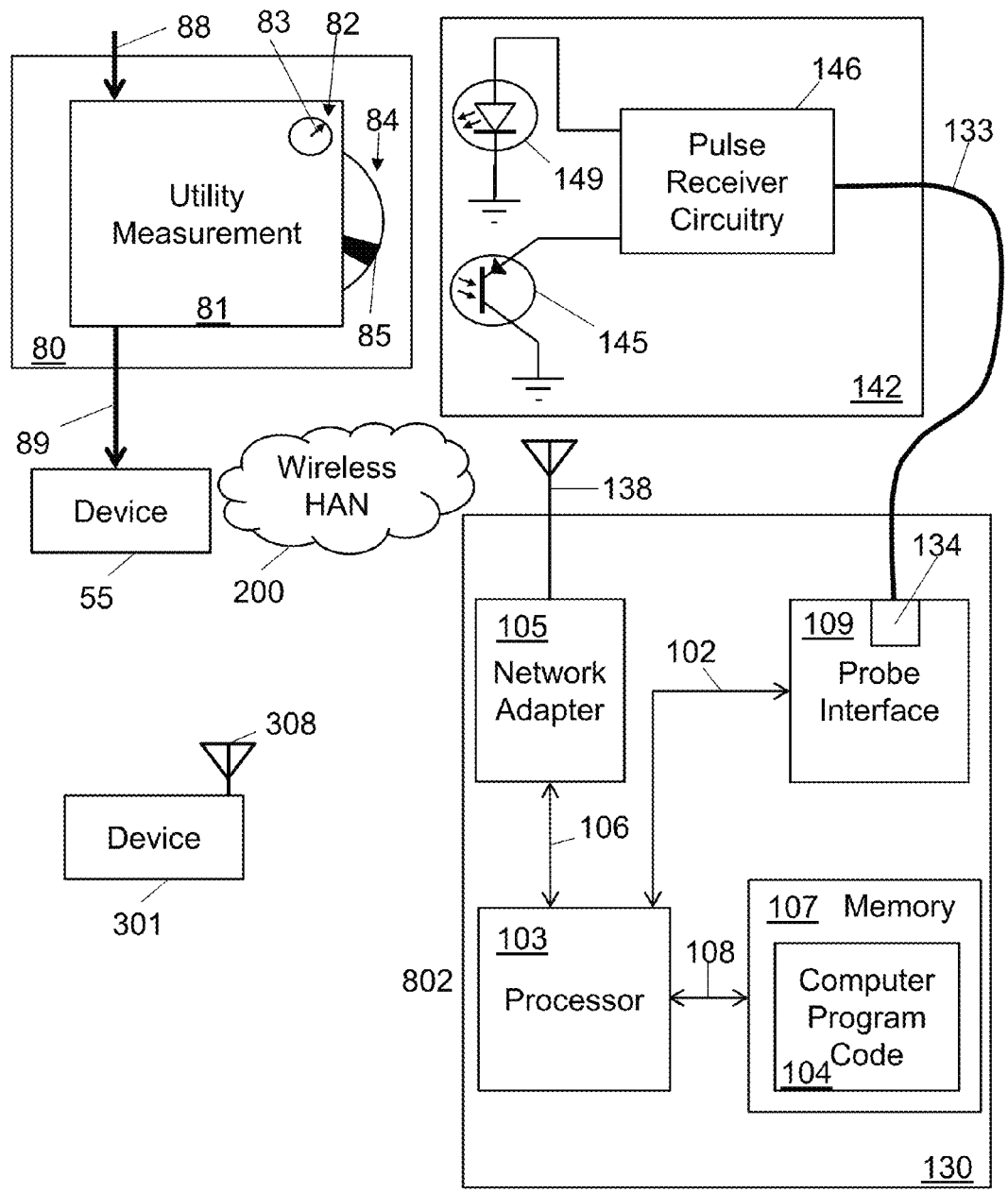
FIG. 2A is a block diagram of an embodiment of a system for monitoring a utility usage.

FIG. 2A is a block diagram of an embodiment of a system for monitoring a utility usage. The system may be used for measuring any type of utility including, but not limited to, electrical power, natural gas and water. A source of the utility, utility connection 88, may connect to a utility meter 80 and be measured by the utility measurement element 81. A metered output 89 may be provided by the utility meter 80 through the infrastructure of a house, business, or other consuming entity to a utility consuming device 55. Infrastructure may vary depending on the utility but may include electrical wiring, gas pipes, plumbing for water, or other types of infrastructure capable of distributing the utility.

Figure 2B:
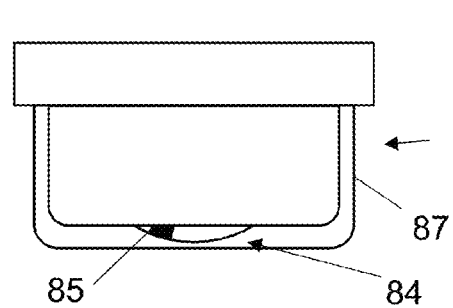
FIGS. 2B and 2C show a top view and front view of a standard utility meter.
Figure 2D:
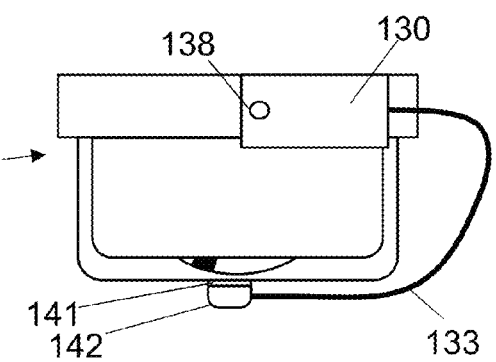
FIGS. 2D and 2E show a top view and front view of an embodiment of a meter monitor attached to the standard utility meter.
Figure 2C:
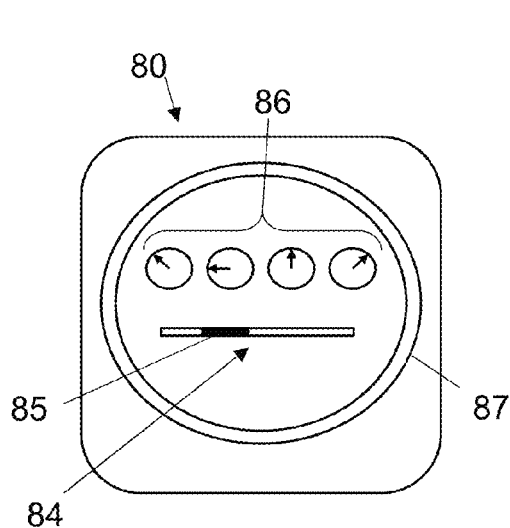

FIGS. 2B and 2C show a top view and front view, respectively, of a standard utility meter 80. The utility meter 80 may have one or more types of display showing the amount of the utility consumed. One type of display is a rotating disc 84 with a dark segment 85. The rotating disc 84 may rotate at a rate that is proportional to the amount of the utility consumed. Another type of display that may be included in the utility meter 80 is one or more dials 86 including a least significant dial 82 with rotating indicator 83. The displays 84, 86 may be visible through a transparent cover 87 that may be made of glass or a clear engineering plastic.

Figure 2E:
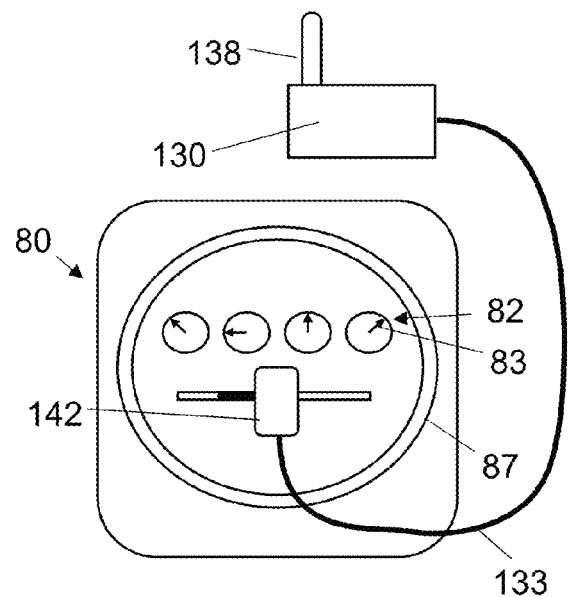

FIGS. 2D and 2E show a top view and front view, respectively, of an embodiment of a probe head 142 attached to the standard utility meter 80. The probe head 142 may be positioned over one of the displays, such as over the rotating disc 84 as shown, using an adhesive 141. In other embodiments, the probe head 142 may be attached to the utility meter 80 by various other methods, including, but not limited to, glue, adhesive sheets, hook-and-loop material, bolts, straps, vacuum cups, screws, brackets, or any other method capable of positioning the probe head 142 in an appropriate position to "read" a display or receive other types of pulses from any other pulse emitter of the utility meter 80. Care should be taken to minimize the amount of ambient light entering the probe head 142 which may impact proper operation.

Referring back to FIG. 2A, the probe head 142 may be a reflective sensor and include a light emitter, such as LED 149 that is positioned over the rotating disc 84 to illuminate a portion of the rotating disc 84. The LED 149 may emit infrared light in some embodiments but other embodiments may use a visible light LED 149. As the rotating disc 84 rotates, one or more high contrast portions, or dark segments 85, of the rotating disc 84 may pass under the LED 149 and vary the amount of light reflected by the rotating disc 84. The reflectivity difference may result from a difference in color, difference in material or other difference that impacts the reflection of the band of wavelengths emitted by the LED 149. An optical receiver, such as optical transistor 145, may detect the amount of reflected/emitted light. In some embodiments, the optical transistor 145 may be sensitive to a particular wavelength of light, such as the wavelength emitted by the LED 149. In some embodiments, a filter or film may be used to block light other than the light emitted by the LED 149. As the rotating disc 84 rotates, a pulse may be generated each time that the dark segment 85 passes under the probe head 142. Pulse receiver circuitry 146 may be able to detect such pulses and employ various techniques to make the pulse distinct, such as amplification, filtering, time averaging, simple level thresholds, hysteresis thresholds, or other techniques well known to one of ordinary skill, although in some embodiments, the raw output from the optical transistor 145 may be passed down the connecting cable 133 with little, if any, processing. In at least some embodiments, the pulse receiver circuitry 146 may include security features to reduce possibilities of fraudulent reporting of utility usage. Such security features may include encryption of communication between the probe receiver circuitry 146 and the communication unit 130, reporting of electronic serial numbers of a probe head, cryptographic signatures, or any other type of feature to make it more difficult to replace an authorized probe head with a fraudulent probe head. In some embodiments, the encryption, which may include a cryptographic signature, may be based on a key that is associated to a particular probe head and may be unique for each probe head manufactured, such as an electronic serial number.

In another embodiment, the probe head 142 may be positioned over the least significant dial 82 so that the rotating indicator 83 may pass under the optical transistor 145. The rotating indicator 83 may have a high contrast with respect to the background of the dial 82 so that a pulse may be generated as the indicator 83 varies the amount of light from the LED 149 is reflected as the indicator 83 passes under the optical transistor 145. The pulse receiver circuitry 146 may employ the same techniques as described above for the rotating disc, variations of the same techniques, or different techniques, to detect the pulses generated by the rotating indicator 83. Other meters may use mechanical wheel counters that may have a reflectance variation to allow the probe head 142 to measure an amount of light that is reflected from the least significant digit of the wheel counter to generate one pulse per rotation. In some meters, a reflective foil may be included in the center of one digit (e.g. '0', '6', '9') to enhance the reflectivity difference, although other techniques may be used by other meters. Other utility meters may utilize a blinking LCD display or other display device that might be detectable by the probe head 142.

In many applications using the reflective sensor probe head 142, the communication unit 130 may be powered by an external battery source due to the power requirement of operating the LED 149. If a battery power source is used for the communication unit 130 with the reflective sensor probe head 142, various methods of minimizing the time that the LED 149 is on may be used, such as only turning on the LED 149 at times the reflectivity is being sampled and sampling at a low rate, such as a few times per second or slower, depending on the characteristics of the meter 80. Some embodiments may utilize an adaptive sampling rate to further minimize the power used. Adaptive sampling may vary the frequency of the samples based on the current estimated utility usage rate, sampling more frequently if the usage rate is high and more slowly if the usage rate is low. Other techniques for minimizing battery use may also be employed, including minimizing the number of times that information is sent over the HAN 200 by buffering and/or consolidating meter readings before sending.

A communication unit 130 may be connected to the probe head 142 by a cable 133, although in other embodiments, the meter emulator and pulse receiver may be integrated into a single package or the meter emulator and pulse receiver may communicate using wireless RF, optical techniques, or over a computer network including a personal area network (PAN), such as Bluetooth, or a HAN/LAN, such as Zigbee, Wi-Fi, or ethernet.

The communication unit 130 may be based on a microprocessor, microcontroller, central processing unit (CPU) or other processing circuitry shown as processor 103. Other embodiments may utilize customized circuitry, such as might be implemented in a field programmable gate array (FPGA) or other custom designed circuitry as the processor 103. The communication unit 130 may include a network adapter 105 coupled to the processor 103 using interconnect 106 which may be a point-to-point interface, a bussed interface, or any other type of proprietary or standardized interface. In some embodiments, the processor 103 and network adapter 105 may be integrated into a single integrated circuit. The network adapter 105 may couple to an antenna 138 for communicating over a network or HAN 200 that may be wireless, such as Zigbee. The communication unit 130 may include one or more semiconductor memory devices 107, such as dynamic random access memories (DRAM), synchronous dynamic random access memories (SDRAM), double data rate memories (DDR), flash memories, read only memories (ROM), electrically erasable programmable read only memories (EEPROM) or other memory devices, that are coupled to the processor 103 using interconnect 108, which may be a standard memory interface or some other type of electrical interconnect. In some embodiments, the processor 103 and memory 107 may be integrated on a single integrated circuit. In at least one embodiment, the processor 103, memory 107 and network adapter 105 may be integrated on a single integrated circuit, such as the CC2530 from Texas Instruments (TI) which includes a Zigbee network interface.

The communication unit 130 may include a probe interface 109, which may include a connector 134 in some embodiments, for communicating with the probe head 142. In some embodiments, the probe interface 109 may be extremely simple and may consist mainly of wiring and passive components to communicate over cable 133, while in other embodiments the probe interface 109 may include communication circuitry, RF demodulators, filtering, digital signal processing, or other sophisticated circuitry to properly interpret the signals sent by the probe head 142. In some embodiments, at least a portion of the probe interface 109 may be included in the processor 103 and/or implemented as software running on the processor 103, but in other embodiments, the probe interface 109 may communicate with the processor over interconnect 102. In some embodiments, the communication unit 130 may communicate with the probe head 142 through the network adapter 105 over the HAN.

The communication unit 130 may include computer program code 104 stored in the memory 107 that can be read and executed by the processor 103 to provide elements of various embodiments. A wide variety of functions may be performed by the computer program code 104, various aspects of which will be discussed later. One aspect of the computer program code 104 may allow the communication unit 130 to communicate over the HAN 200 with an auxiliary device 301 including antenna 308. In at least one embodiment, the auxiliary device 301 may be able to store utility usage information received from the communication unit 130.

In some embodiments, the auxiliary device 301 may provide certain functionality, such as controlling and monitoring the power consumed by other devices on the HAN 200. The auxiliary device 301 may be given a variety of different names in various embodiments, such as a network controller, lighting gateway, power management console, or other names. The auxiliary device 301 may work in concert with one or more of the probe head, communication unit 130, and other devices on the network, to provide a full implementation of various embodiments. In some networked embodiments, the auxiliary device 301 may implement network management functions. Network management functions can include, among other things, maintaining a list of interconnected devices and maintaining routing tables. In particular, network coordinators are used with Zigbee networks and network controllers are used with Z-Wave networks.

Figure 3A:
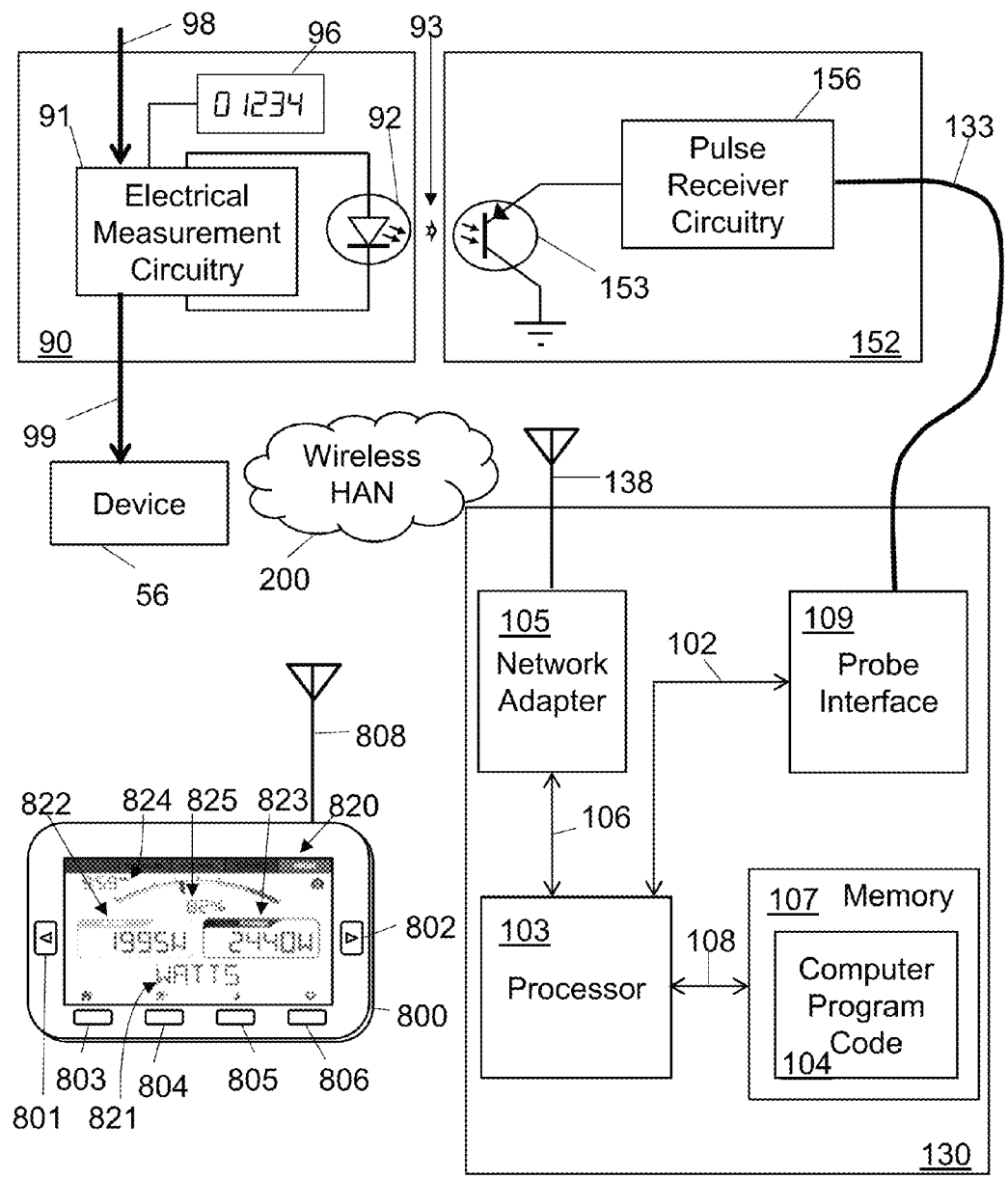
FIG. 3A is a block diagram of an alternative embodiment of a system for measuring a utility usage.

FIG. 3A is a block diagram of an alternative embodiment of a system for measuring a utility usage. The system may be used for measuring any type of utility, but electrical power is shown as an example. A source of electrical power, electrical connection 98, may connect to an electrical utility meter 90 and be measured by the electrical measurement circuitry 91. Metered electrical power 99 may be provided by the electrical utility meter 90 over the electrical wiring infrastructure of a house, business, or other consuming entity to power a device 56.

FIGS. 3B and 3C show a top view and front view, respectively, of a standard electrical utility meter 90. The electrical utility meter 90 may have one or more types of display showing the amount of electrical power consumed. In some embodiments, the electrical utility meter 90 may have a mechanical display similar to the utility meter 80 of FIG. 2B/C. The standard electrical meter 90 shown has an electronic display 96 that may utilize LCD or other display technology to show the current meter reading. The standard electrical meter 90 may include an LED 92 that emits optical pulses of light 93, as shown in FIG. 3E, dependent on the amount of electrical power measured by the electrical utility meter 90. In some embodiments, the LED 92 may be on the top of the meter 90 as shown, but in other embodiments, the LED may be on the front of the meter 90 or in some other location on the meter 90. Depending on the utility meter, the light 93 may be infra-red, red, amber, yellow, green, or any other color. In some embodiments, the electrical utility meter 90 may emit one pulse of light 93 for each Watt-hour (Wh) of electrical power used. Other embodiments may use a different number of Wh per pulse emitted, such as one pulse per 100 Wh, one pulse per 720 Wh, one pulse per 1 kilowatt-hour (kWh), one pulse per 7.2 kWh, one pulse per 12 kWh, or any other rate depending on the electrical utility meter 90. The display 96 and LED 92 may be visible through a transparent cover 97 that may be made of glass or a clear engineering plastic.

FIGS. 3D and 3E show a top view and front view, respectively, of an embodiment of a probe head 152A, which may have the same electronics of the probe head 152 of FIG. 3A, but is mechanically designed to be strapped to a cylinder, on the top of a standard electrical utility meter 90. The probe head 152A may be positioned over the LED 92 to be able to detect the emitted light 93 from the LED 92. The probe head 152A may be attached to the electrical utility meter 90 using a strap 151. In other embodiments, a probe head 152 may be attached to the electrical utility meter 90 by various other methods, including, but not limited to, glue, bolts, adhesive pads, hook-and-loop material, vacuum cups, screws, brackets or any other method capable of positioning the probe head 152 in an appropriate position to receive the light 93 emitted by the LED 92.

Referring back to FIG. 3A, the probe head 152 may include an optical receiver, such as optical transistor 153, which may detect the light 93 emitted by the LED 92. Some embodiments may utilize a reflective probe head 142 but simply turn off the LED 149. Depending on the embodiment, the optical transistor 153 may be sensitive to a broad spectrum of light or may be tuned to the particular wavelength of light 93 emitted by the meter 90. In some embodiments, a filter or film may be used to block light other than the light 93 of the bandwidth emitted by the meter 90. Care should be taken to properly shield the area around the probe head 152 to avoid interference from ambient light. Pulse receiver circuitry 156 may be able to detect such pulses and employ various techniques to make the pulse distinct, such as amplification, filtering, time averaging, simple level thresholds, hysteresis thresholds, or other techniques well known to one of ordinary skill. To compensate for changing ambient light conditions, an adaptive comparator level may be used that is dependent on the amount of light being received during the interval between pulses. Some embodiments may measure the ambient lighting levels at times that the LED 92 is not on and subtract that from the output of the optical transistor 153. The pulse receiver circuitry 156 may then send the pulse information to the communication unit 130 over the probe cable 133. In other embodiments, a wireless link may be used in place of the cable 133. In some embodiments, the network 200 may be used for communication between the probe head 152 and the communication unit 130, and in other embodiments, the probe head 152 and communication unit 130 may be integrated into a single package allowing printed circuit traces to be used for the communication.

The communication unit 130 may the same as that described in FIG. 2A above in some embodiments. Because there is no LED being driven in the probe head 152, very little power may be required while waiting for the next light pulse. So to minimize power even further in battery powered embodiments, the processor 103 may be put into sleep mode between pulses and may use the pulse itself as a wake event. This reduces power significantly from a polling mode of operation.

In some embodiments, an information display 800 may be configured to communicate with a smart utility meter over the HAN 200 with antenna 808. The communication unit 130 may be configured to respond as a smart utility meter allowing the information display 800 to provide information to a user about their use of the utility. The information display 800 may also be a multi-mode display device using a monochrome liquid crystal display (LCD) module 820 with a color overlay. The information display 800 may be back-lit or may use ambient light from the room for visibility. Other embodiments may use different display technology including, but not limited to, thin film transistor (TFT) color LCD, organic light emitting diode (OLED), cathode ray tube (CRT), plasma, or other display technologies. The information display 800 may have several buttons for user control located in the bezel. In the embodiment shown, back button 801 and forward button 802 may be used to control the mode of the information display 800. The Home/OK button 803, the Away/Cancel button 804, the Night/Down button 805 and Up/Settings button 806 may be used for various purposes within the user interface (UI) of the information display 800.

The information display 800 may include various independently addressable display elements, or a fixed set of displayable elements, that may vary between embodiments. Other embodiments may use a matrix addressable pixel-based display. Display elements above the UI buttons 803-806 may be included to allow the current function of the buttons 803-806 to be displayed. The embodiment shown includes a 15 character text line 821. Each character of the text line 821 may be made up of 15 segments that may be used to create a wide variety of symbols including representations of most letters used in languages using variations of the Latin alphabet, including, but not limited to, English, Danish, German, French, Spanish, Norwegian, Swedish, and others. Other embodiments may use other implementations for text, such as a 5×7 dot matrix, a 7, 14, or 16 segment display, or some other type of character display.

The information display 800 also may include other delineated display areas, such as the "actual" display area 822 and/or the target/average display area 823. The "actual" display area 822 and target/average display area 823 may include display elements for various currency symbols including, but not limited to US Dollars ($), British Pounds (£), Euros (€) and/or Danish Kroner (Kr). The display areas 822, 823 may also include display elements for showing kW and/or kW-h to allow for energy and/or power readings to be displays as well and some embodiments may include display elements allowing for units of other utilities, such as Therms, BTU, $ft^3$, Gal. liter, or other units. The display areas 822, 823 may also include a multi-character display allowing numbers and/or other characters to be displayed. In the embodiment shown, the "actual" display area 822 and the target/average display area 823 each include 5 characters.

The information display 800 may also include a clock display 824 allowing the current time to be displayed in either 24 hour or 12 hour format and may have current value display 825 with a multi-purpose gauge display that may be used to show the same value at some times and different values at other times. Other icons or symbols may also be included in some embodiments, such as an electric vehicle (EV), fan indication, a snowflake, a thermometer, a wireless signal strength meter, a low battery indication and/or a company logo. Other embodiments may include other icons or symbols and yet other embodiments may not include all the elements shown.

Each individual element of the display may be controlled to be either on or off, although in some cases, not every combination of elements may be supported. For example, in some embodiments, the 15 segment display may only support a limited number of characters, such as 828 or 256 different pre-determined characters, instead of the 32768 different possible combinations of the 15 elements. Some embodiments may support a display technology allowing for an intensity level or color to be set instead of having each element being only on or off.

The information display 800 may have a variety of operating modes to allow different types of information to be displayed on a single display. In some embodiments, an electric vehicle charging station may be monitored. In some embodiments, the information display 800 may be used as a thermostat. In some embodiments, the information display 800 may be able to display a variety of information related to home energy usage, including information that may be received by communicating with a smart meter or a smart meter emulator, which may be implemented in the program code 104 and/or another device on the HAN 200 that receives information from the communication unit 130. Other embodiments may have modes for displaying other information.

One possible display pattern of the information display 800 related to home electrical usage is shown. The information display 800 may show current power usage in the "Actual" display area 822 and the average power usage over a predetermined period of time in the target/average display area 823. The current power usage as a percentage of the average power usage may be shown on the gauge 825 and the character display 821 may show "WATTS" to indicate that a current power level is being displayed.

Figure 4:
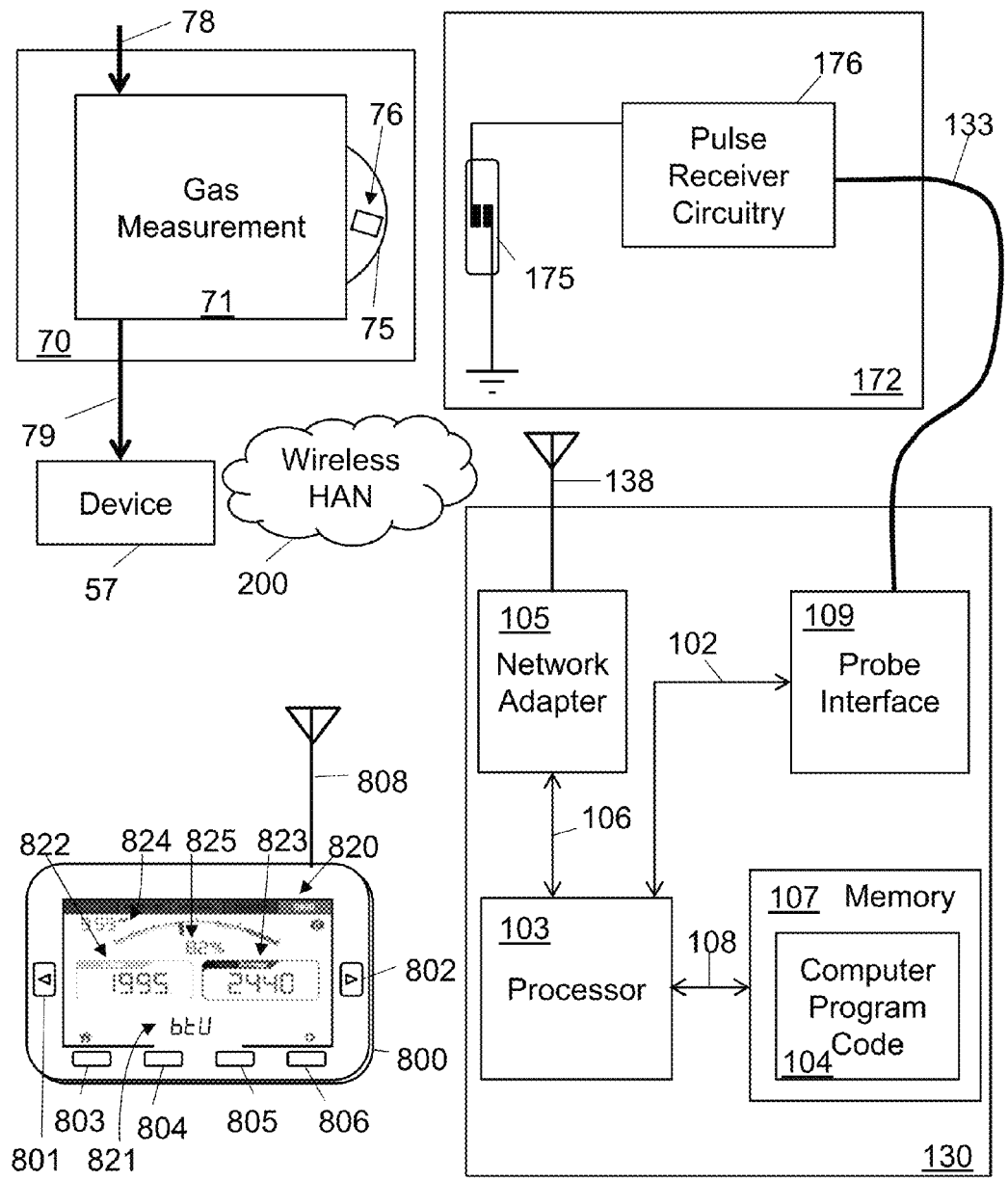
FIG. 4 is a block diagram of another embodiment of a system for measuring a utility usage.

FIG. 4 is a block diagram of an alternative embodiment of a system for measuring a utility usage. The system may be used for measuring any type of utility, but natural gas is shown as an example. A source of gas, connection 78, may connect to a gas utility meter 70 and be measured by the gas measurement mechanism 71. Metered natural gas 79 may be provided by the meter 70 over the gas pipe infrastructure of a house, business, or other consuming entity to a device 57 that consumes gas.

The gas meter 70 may have one or more types of display showing the amount of gas consumed. In some embodiments, the gas meter 90 may have a mechanical counter 73 as shown in FIG. 7. The mechanical counter 73 may include one wheel for each significant digit of the counter. The least significant digit wheel 75 (which is shown in FIG. 4, but covered by the probe head 261 in FIG. 7) may have a magnet 76 embedded at one position of the wheel 75. A magnetic detector probe head 172 may be positioned above the least significant digit wheel 75. The probe head 172 may be attached to the gas meter 90 using adhesive pads, hook-and-loop material, or any other method capable of positioning the probe head 172 in an appropriate position to detect the magnetic field of the magnet 76.

Referring back to FIG. 4, the probe head 172 may include a magnetic detector, such as a magnetic reed sensor 175 or a Hall effect sensor. Pulse receiver circuitry 176 may be able to detect the output of the sensor 175 and employ various techniques to make the pulse distinct, such as amplification, filtering, time averaging, simple level thresholds, switch debounce, hysteresis thresholds, or other techniques well known to one of ordinary skill. The pulse receiver circuitry 176 may then send the pulse information to the communication unit 130 over the probe cable 133. The communication unit 130 may be the same as that described in FIG. 2A above, or may have a somewhat different design, depending on the embodiment.

If a magnetic reed sensor 175 is used, very little power may be required while waiting for the next closing of the contacts and power may be minimized even further in battery powered embodiments by putting the processor 103 into sleep mode between contact closing events and use the contact closing itself as a wake event. This reduces power significantly from a polling mode of operation. If a Hall effect sensor is used, more power may be required and the pulse receiver circuitry 176 may be more complex to interpret the output of the Hall effect sensor. One additional feature of the Hall effect sensor is that it may allow for detecting that the probe head 172 is incorrectly mounted and no magnetic field is detectable.

One possible display pattern of the information display 800 related to home gas usage is shown in FIG. 4. The information display 800 may show the month-to-date gas usage in the "Actual" display area 822 and the average gas usage per month in the target/average display area 823. The current gas usage as a percentage of the average gas usage may be shown on the gauge 825 and the character display 821 may show "BTU" to indicate that information about natural gas usage is being displayed.

Figure 5:
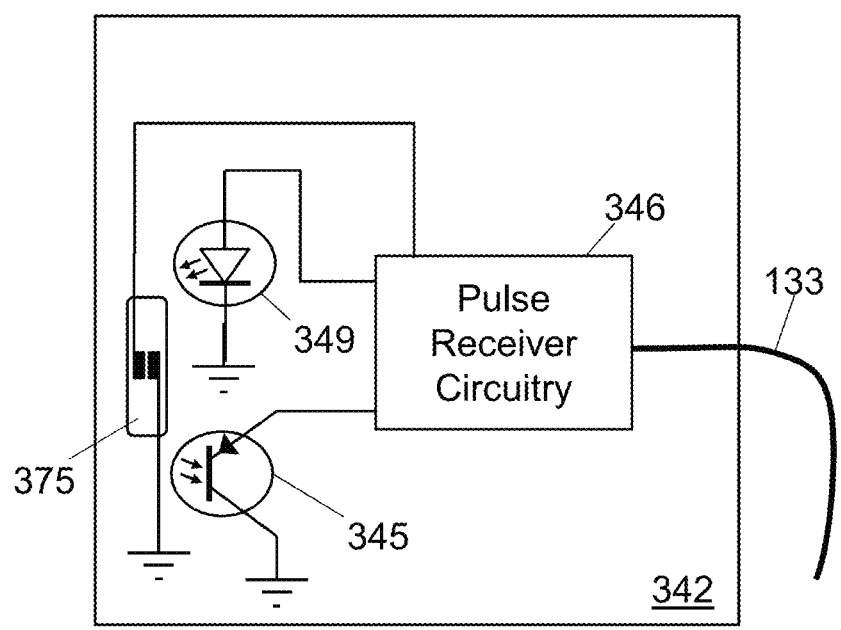
FIG. 5 is a block diagram of an embodiment of a multi-mode probe head.

FIG. 5 is a block diagram of a multi-mode probe head 342 that may be used as a reflective probe head, a light detecting probe head, or a magnetic probe head. The multi-mode probe head 342 includes an LED 349 for generating light to be reflected, the optical transistor 345 for detecting reflected light from the LED 349 or light emitted from the meter, and a magnetic reed sensor 375 for detecting the presence of a magnetic field. The LED 349 may emit infrared light or visible light depending on the embodiment and may be controlled by the pulse receiver circuitry 346 to be off or to emit some amount of light. The optical transistor 345 and the magnetic reed sensor 375 may both be coupled to the pulse receiver circuitry 346.

Depending on the embodiment, the pulse receiver circuitry 346 may determine which type of meter it has been attached to by first monitoring both the magnetic reed sensor 375 to see if a magnetic field is detected. If a magnetic field is detected, the pulse receiver circuitry 346 may simply continue to monitor the magnetic reed sensor 375 and send pulses on the probe cable 133. If no magnetic field is detected, or in parallel with waiting for a magnetic field in some embodiments, the pulse receiver circuitry 346 may monitor the output of the optical transistor 345. If optical pulses are detected by the optical transistor, the pulse receiver circuitry 346 may continue to monitor the output of the optical transistor 345 for pulses and send the pulses on the probe cable 133. If no activity is detected from either the magnetic reed sensor 375 or the optical transistor 345, the pulse receiver circuitry 346 may enable the LED 349 and then monitor the output of the optical transistor 345 for differences in the reflected light. If reflected pulses are detected, the LED 349 may be left on, and the output of the optical transistor monitored for pulses which may then be sent on the probe cable 133.

In other embodiments, the pulse receiver circuitry 346 may be controlled by the communication unit 130 over the cable 133 with the communication unit 130 performing a method similar to that described above. In other embodiments, the communication unit 130 may use other methods to determine what mode to operate the multi-mode probe head 342 and directly control the pulse receiver circuitry 346. In one embodiment, the communication unit 130 may be configured using user input to determine the operating mode of the multi-mode probe head 342. In other embodiments, the communication unit 130 may access a server using location information to determine the meter type and use that information to configure the multi-mode probe head 342. Other embodiments may use different methods to determine how to configure the multi-mode probe head 342.

Figure 6A:
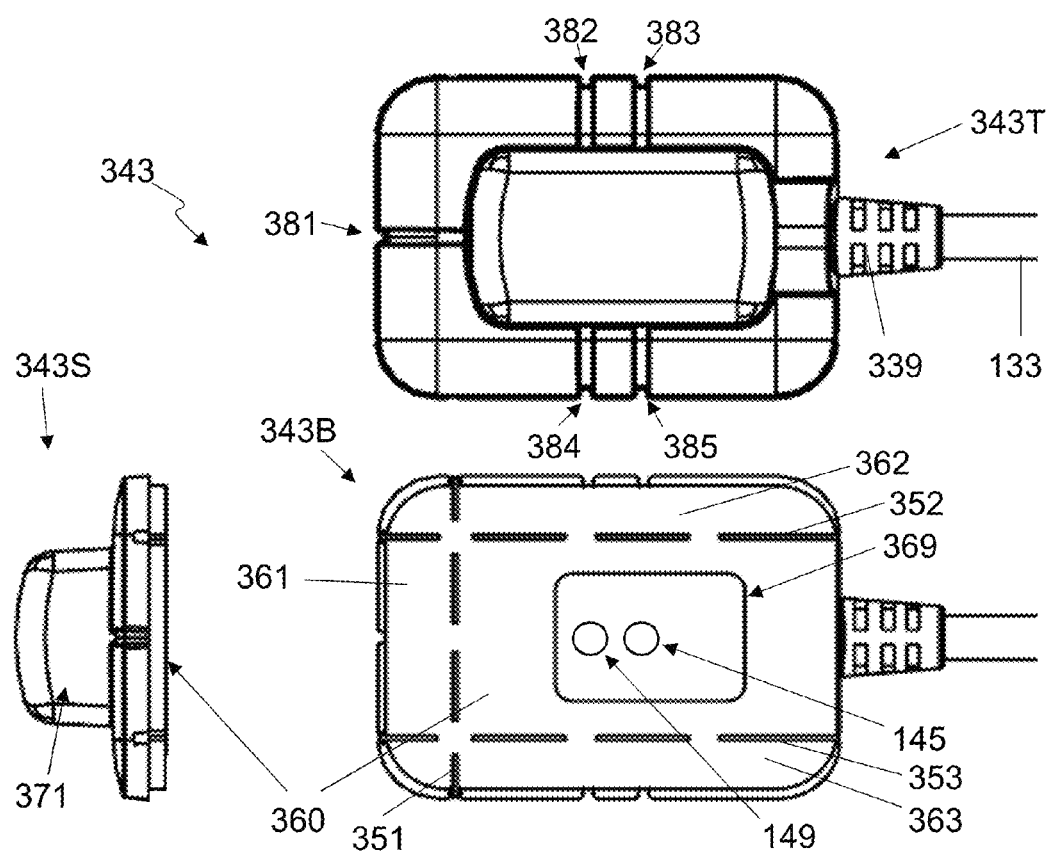
FIG. 6A shows a three-view mechanical drawing of an embodiment of a probe head.

FIG. 6A shows a three-view mechanical drawing of embodiment of an embodiment of a probe head 343. The first view 343T shows the probe head 343 from the top, the second view 343B, shows the probe head 343 from the bottom, and the third view 343S shows the probe head 343 from the side opposite of the cable 133. The probe head 343 may be mechanically similar to the probe heads 241, 242 of the meter monitoring assembly 240 of FIG. 1B. The electrical components of the probe head 343 may be located in a cavity 371 inside the probe head 343, and may be similar to those shown for probe head 142 of FIG. 2A. The LED 149 and optical transistor 145 may be seen through the optically transparent window 369. Other embodiments may include different electrical components, including embodiments using the circuitry of probe head 342, shown in FIG. 5. A strain relief 339 may help alleviate stress points on the cable 133 where it exits the probe head 343.

The probe head 343 may have a bottom surface 360 and may also have flanges on one or more sides, such as the right flange 363, the top flange 361 and the left flange 362. The flanges 361-363 may help block ambient light from interfering with the detection of a blinking LED or the reflected light from the meter. One or more flanges 361-363 may be removed to facilitate installation on certain meters. Breakaway grooves 351-353 may be included to allow for easy removal of one or more flanges 361-363, although some embodiments may require tools to break or cut off a flange 361-363. The left breakaway groove 352 may facilitate removal of the left flange 362, the right breakaway groove 353 may facilitate removal of the right flange 363, and the top breakaway groove 351 may facilitate removal of the top flange 361. Adhesive may be included on at least part of the main body front surface 360, but may not cover the transparent window 369 in some embodiments. Adhesive may also be included on at least part of the top flange 361, the left flange 362 and the right flange 363, so that even if one or more flanges 361-363 are removed, there is enough adhesive to securely attach the probe head 343 to the meter.

Alignment grooves 381-385 are marks on the probe head 343 that may be used to position the probe head 343 on the meter. The alignment grooves 381-385 may be used in conjunction with a template, such as the embodiment of a template 390 of FIG. 6B. The top alignment groove 381 may be in line with the LED 149 and the optical transistor 145. The front right alignment groove 382 and the front left alignment groove 384 may be in line with the LED 149. The rear right alignment groove 383 and the rear left alignment groove 385 may be in line with the optical transistor 145. Some embodiments may include notches as marks along with the alignment grooves 381-385, as shown in FIG. 6A. Other embodiments may use lines, printed, painted, or otherwise applied to or incorporated into the probe head 343 as marks in place of the alignment grooves 381-385. Alignment may be aided in some embodiments by having an externally visible LED (not shown) blink each time an input pulse is received during installation. The externally visible LED may be included in the probe head 343 or in the communication unit 130, depending on the embodiment. In some embodiments, the visible LED may blink to indicate an input pulse was received for 5 minutes from the time the installation begins. The beginning of installation may be signified by attaching the probe head 343 to the communication unit 130. In other embodiments, a button may be included on the communication unit 130 or the probe head 343 to indicate that the installation period has begun.

Figure 6B:
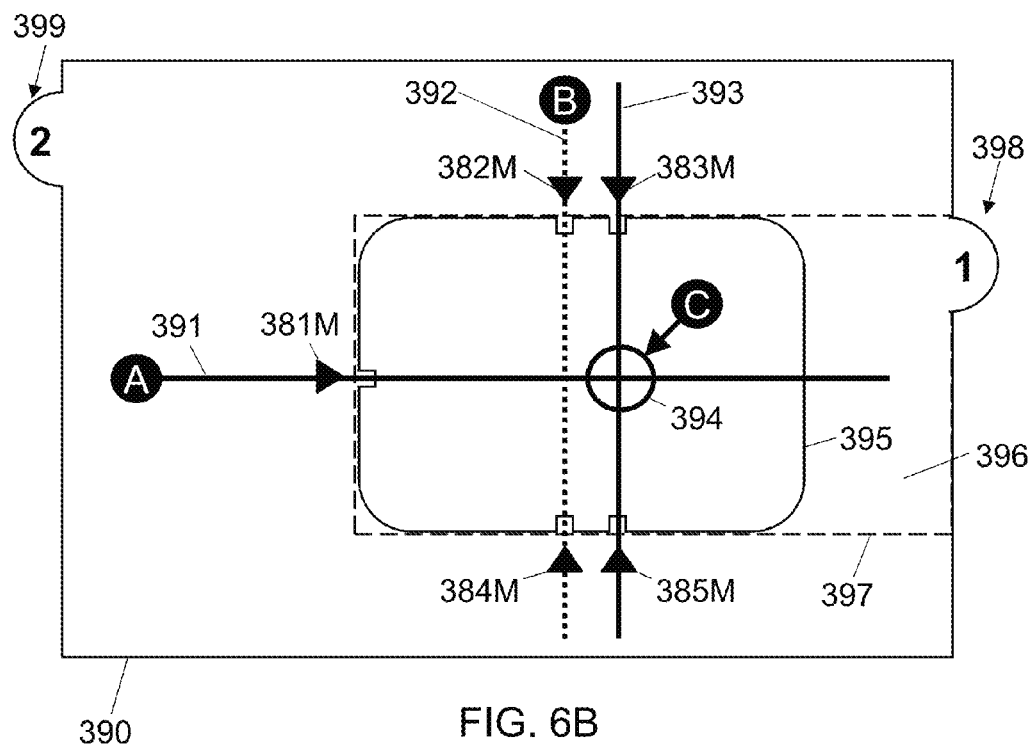
FIG. 6B shows an embodiment of an alignment template for positioning a probe head on a meter.

FIG. 6B shows an embodiment of an embodiment of an alignment template 390 for positioning a probe head 343 of FIG. 6A on a meter. The alignment temple 390 may be made of a transparent material, such as a clear plastic or polyester film, and may be flexible, semi-rigid, or rigid, depending on the embodiment. An adhesive may be affixed to the back of at least part of the template 390. The adhesive may be a temporary adhesive in some embodiments. Other embodiments may utilize static electricity of other physical effects to hold the template 390 on the meter during installation of the probe head.

The template 390 may include various lines or other markings to facilitate positioning the template on a meter. A center alignment line 391, which may be marked with an "A" in some embodiments, may indicate the center line of a desired position of a probe head. An emitter alignment line 391, which may be marked with a "B" in some embodiments, may indicate a desired position of a light emitter of a probe head. A receiver alignment line 393 may indicate a desired position of a light receiver of a probe head. An LED alignment circle 394, which may be marked with a "C" in some embodiments, may indicate a desired position of a light emitter of the meter. A probe head outline 395 may indicate the desired position of a probe head. A top alignment mark 381M may be included on the center alignment line 391 near the probe head outline 395. A front right alignment mark 382M and a front left alignment mark 384M may be included on the emitter alignment line 392 near opposite sides of the probe head outline 395. A rear right alignment mark 383M and a rear left alignment mark 385M may be included on the receiver alignment line 393 near opposite sides of the probe head outline 395. A first tab 398, which may be marked with a "1" in some embodiments, may be a part of a removable section 396 of the template 390. The removable section 396 may be separated from the rest of the template 390 by perforated lines 397 to facilitate the removable section 390 parting from the rest of the template 390. A second tab 399, which may be marked with a "2" in some embodiments, may be a part of the rest of the template 390. Some embodiments may also have instructions printed directly on the template 390.

Figure 6C:
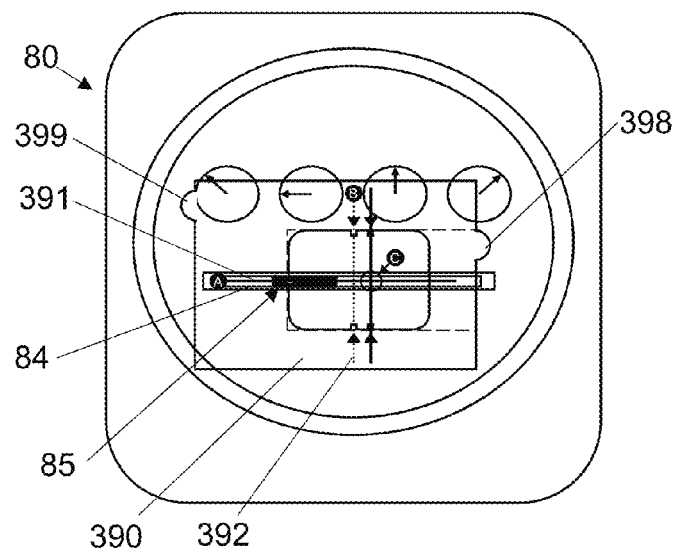
FIG. 6C shows the alignment template of FIG. 6B attached to a meter.

FIG. 6C shows the alignment template 390 of FIG. 6B attached to a meter 80 having a rotating disc 84 with a dark element 85. The template 390 may be affixed to the face of the meter 80 so that the center alignment line 391 is positioned directly over the rotating disc 84 and the emitter alignment line 392 is centered over the rotating disc 84, or is positioned at the point where the rotating disc 84 is closest to the face of the meter 80. Once the template 390 is affixed to the meter 80 in the desired position, the first tab 398 may be pulled to remove the removable section 396 at the perforated lines 397 from the rest of the template 390. The parts of the template 390 that are not being removed may be held in place by adhesive and/or a user as the removable section 396 is removed. In some embodiments, the removable section 396 may not have adhesive to facilitate its removal.

The alignment marks 381M-385M, as shown in FIG. 6B, may be on the section of the template that is not removed, so the user can use the alignment marks 381M-385M to position the probe head 343 on the meter 80. The user may affix the probe head 383 to the meter 80 so that the top alignment groove 381 is matched with the top alignment mark 381M, the front right alignment groove 382 is matched with the front right alignment mark 382M, the rear right alignment groove 383 is matched with the rear right alignment mark 383M, the front left alignment groove 384 is matched with the front left alignment mark 384M, and the rear left alignment groove 385 is matched with the rear left alignment mark 385M. By aligning the alignment grooves 381-385 of the probe head 343 with the alignment marks 381M-385M of the template 90, the probe head 343 may be positioned on the meter 80 so that the probe head 343 may be able to detect the indications of utility use that the meter 80 provides.

The various markings 391-395 on the template 390 may be specific to a particular probe head and to a particular set of meters. The template 390 in FIG. 6B may be specific to the probe head 343 and a set of meters that have either a rotating disc 84 with a dark element 85, such as the meter 80 of FIG. 2A, or an output LED 92 visible through a flat surface. Templates for other probe heads, and/or other meters may have different markings. For example, a template for a probe head having a mechanical outline similar to probe head 343, but with a magnetic sensor, may have markings similar to the alignment marks 381M-385M and the probe head outline 395, but may have another mark to indicate where the magnetic sensor is located within the probe head. A similar process to that described above may be used to position the particular probe head on a particular set of meters.

FIG. 7 shows an embodiment of a single communication unit 130 monitoring both a gas meter 70 and a utility meter 80, which may meter electricity. The communication unit 130 may communicate over a wireless network using antenna 138 to send information related to both gas and electric usage. A dual head meter monitoring probe 260 with a first probe cable 233 coupled to a gas optical probe head 261 and a second probe cable 232 coupled to an optical probe head 242 is connected to the communication unit 130. The optical probe head 242 may be affixed to the meter 80, as described above to allow it to monitor the rotating disk 84 and detect the dark segment 85 passing by, as shown in FIG. 2A, to generate a pulse to the communication unit 130. The gas optical probe head 261 may be positioned over the gas meter mechanical counter 73, and may be used to monitor the gas meter 70 in some embodiments. In some embodiments, a gas magnetic probe 262 that is coupled to the gas optical probe head 261 by secondary cable 235, may be attached to the gas meter 70 at a point that allows the magnetic probe 262 to detect changes in a magnetic field generated by the gas meter 70 as gas flows through the gas meter 70. In some embodiments, the gas optical head 261 may also have a magnetic sensor to allow it to detect a magnet in the least significant digit wheel 75 of the mechanical counter 73. A template designed for the particular type of gas meter 70 and/or a set of instructions to the user may be used to position the gas optical probe head 261 and/or the gas magnetic sensor 262 on the gas meter 70 to that a pulse can be sent to the communication unit 130 dependent on the usage of gas detected by the gas meter 70.

In at least one embodiment, the communication unit 130 may include computer program code which be stored on a non-transitory storage medium, such as local memory, an optical disc, a hard-drive, flash memory, other non-volatile memory, or other machine readable media. The computer program code may include instructions that, if executed, may result in receiving an indication of a characteristic of a first utility meter 80 from a first probe head 242, receiving an indication of a characteristic of a second utility meter 70 from a second probe head 261, 262, and sending a message indicating the usage of the first utility or the second utility. The characteristic of the first utility meter 80 may be dependent on a usage of a first utility metered by the first utility meter 80, and the characteristic of the second utility meter 70 may be dependent on a usage of a second utility metered by the second utility meter 70. In the embodiment shown, the characteristic of the first utility meter 80 may be light reflected by the rotating disk 84 and the characteristic of the second utility meter 70 may be magnetic field based on a magnet embedded in the least significant digit of the mechanical counter 73.

Figure 8:
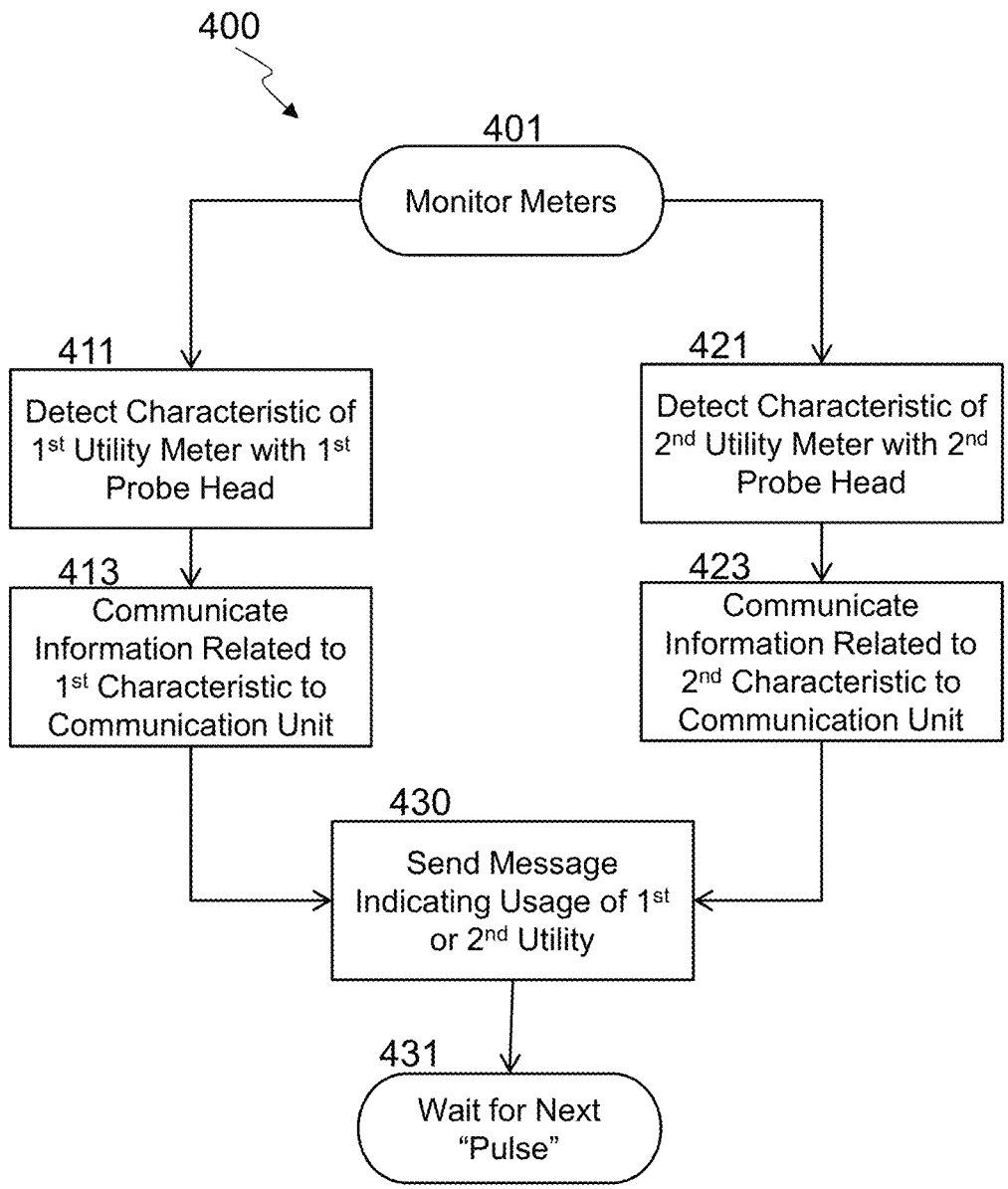
FIG. 8 is a flow chart of an embodiment of a method of monitoring utility meters.

FIG. 8 is a flow chart 400 of an embodiment of a method of monitoring utility meters. The flow chart 400 may begin by monitoring two meters at block 401. Other embodiments may monitor one, three, or more meters. A meter may emit a pulse, or a change in a characteristic. The characteristic may be the same type of characteristic for the two meters, or may be different, depending on the embodiment. The characteristic of the first utility meter may be detected with a first probe head at block 411. The characteristic of the first utility meter is dependent on a usage of a first utility metered by the first utility meter. The characteristic may be light pulses emitted by the first utility meter, light reflected by the first utility meter, a varying magnetic field of the first utility meter, an image of an indicator of the first utility meter, or other characteristic.

Information related to the characteristic of the first utility meter may be communicated from the first probe head to a communication unit at block 413. The communication may take place over a cable, which may be about 3 meters (m) in length or less in some embodiments. A first message may be sent from the communication unit at block 430, indicating the usage of the first utility. In some embodiments, the message may be sent over a wireless network, such as IEEE 802.11 or other radio frequency network, an optical network, or a power-line network.

A characteristic of a second utility meter may be detected with a second probe head at block 421. The characteristic of the second utility meter is dependent on a usage of a second utility metered by the second utility meter. Information related to the characteristic of the second utility meter may be sent from the second probe head to the communication unit at block 423. In some embodiments, block 413 and block 423 may be capable at simultaneously occurring, but in other embodiments, protocols may be in place to hold off one communication until the other communication has completed, to provide for discrete time slots for the two communications to take place, or other methods may be used to prevent collisions.

A message may be sent at block 430 from the communication unit indicating the usage of the second utility. In some embodiments, the message indicating the use of the first utility and the message indicating the use of the second message may be sent separately, holding off one message until the other has been sent. In some embodiments, a single message may be sent indicating usage of both the first and second utility. The flow chart 400 may complete at block 431 by waiting for another change in characteristic.

Figure 9A:
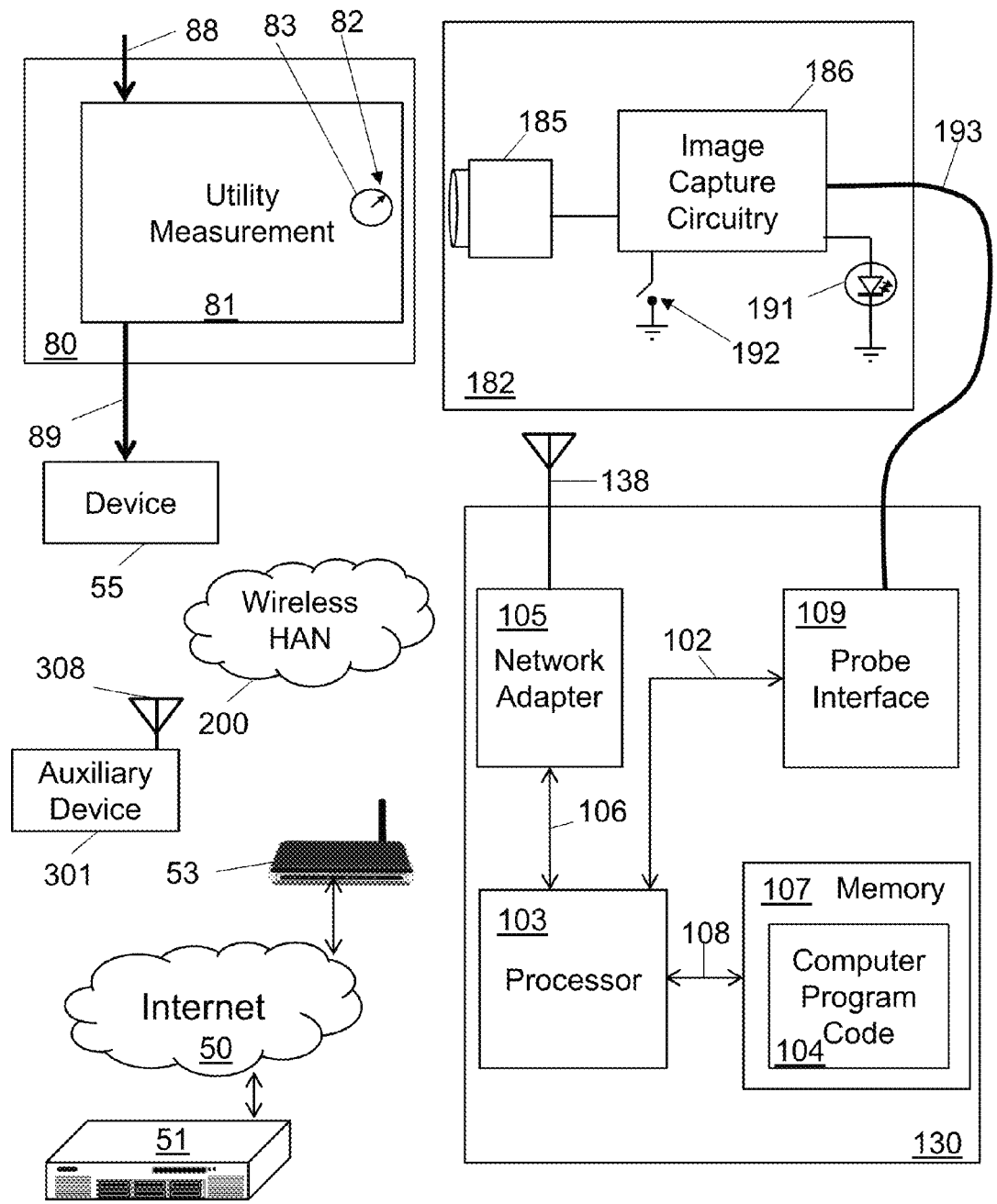
FIG. 9A is a block diagram of an additional embodiment of a system for measuring a utility usage.

FIG. 9A is a block diagram of an additional embodiment of a system for measuring a utility usage using image capture. The system may be used for measuring any type of utility including, but not limited to, electrical power, natural gas and water. A source of the utility, utility connection 88, may connect to a utility meter 80 and be measured by the utility measurement element 81. A metered output 89 may be provided by the utility meter 80 through the infrastructure of a house, business, or other consuming entity to a utility consuming device 55. Infrastructure may vary depending on the utility but may include electrical wiring, gas pipes, plumbing for water, or other types of infrastructure capable of distributing the utility. The utility meter 80 may have one or more types of display showing the amount of the utility consumed. One type of display is counter display showing a utility usage in the form of a string of numerical digits. The counter may be electronic or mechanical. Another type of display that may be included in the utility meter 80 is one or more dials including a least significant dial 82 with rotating indicator 83.

A probe head 182 may be attached to the standard utility meter 80 so that an image capture device 185 may be able to capture an image of at least a portion of the display of the utility meter 80. The probe head 182 may be positioned over some number of the least significant digits of a counter display or over one or more of the least significant dials, such as the least significant dial 83. The probe head 182 may be attached to the utility meter 80 by various methods, including, but not limited to, glue, adhesive sheets, hook-and-loop material, bolts, straps, vacuum cups, screws, brackets, or any other method capable of positioning the probe head 182 in an appropriate position to capture an image of at least a portion of the display of the utility meter 80.

In some embodiments, the image capture device 185 may be a CCD array, and in other embodiments the image capture device 185 may be a CMOS image capture chip, but other embodiments may use other types of image capture devices. The image capture device 185 may be sensitive to optical light in some embodiments, but may utilize infrared light in other embodiments to help avoid interference from ambient visible light. Various films and/or filters may be used to remove unwanted wavelengths in front of the image capture device 185. The image capture device 185 may be a monochrome device or may capture multiple wavelengths independently, such as a full color camera. A lens may be included in some embodiments and may have a fixed focus or variable focus, although some embodiments may utilize a small aperture with no lens or a non-focusing lens to provide a large depth of field. A LED or other illumination device may be included in the probe head 182 in some embodiments. The LED may emit infrared light in some embodiments. In some embodiments, an indicator, such as an indicator LED 191, may be included as an externally visible indication on the probe head 182 that an image has been captured and/or that power is on. Some embodiments also include a button 192 on the probe head 182 that may be used for one or more purposes, such as to start an installation period, or to manually capture an image. In some embodiments, the button 192 and the indicator LED 191 may work in tandem to help with proper installation. The user may push the button 192 to indicate that the probe head 182 is being installed, and the indicator LED 191 may be illuminated once the probe head 182 is aligned and a usable image is captured.

Image capture circuitry 186 may be coupled to the image capture device 185 to manage the operation of, and receive the raw data from, the image capture device 185. The image capture circuitry 186 may provide preliminary processing of the raw data received from the image capture device 185, such as conversion to a monochrome, RGB, or YUV color gamut, brightness and/or contrast manipulation, and/or packetization of the data for transmission to the communication unit 130. In some embodiments, the image capture circuitry may perform additional processing of the image data, such as digital filtering, resizing, cropping, motion detection, and/or image compression. Motion detection may be used to minimize the number of images sent by only sending images if motion has occurred. The image capture circuitry 186 may then send the image to the communication unit 130 over the cable 193. In some embodiments, the data may be sent as a simple serial data stream with minimal protocol, but in other embodiments, the data may be sent over the cable 193 using a standard or proprietary protocol, such as DisplayPort, USB, IEEE-1394, or ethernet. In some embodiments, the image may be sent as an analog or digital video stream over the cable 193, but many embodiments may send discrete still images.

A communication unit 130 may be the same or similar to the communication unit 130 of FIG. 2A, although some embodiments may provide a different communication unit with different capabilities for use with an image capture probe head 182. The communication unit 130 may receive the image(s) from the probe head 182, and may or may not perform additional image processing on the image, such as cropping, resizing, filtering or other processing before sending the image(s) over the HAN 200. In some embodiments the image(s) may be sent to an auxiliary device 301, which may communicate with the HAN 200 using antenna 308, or to a personal computer (PC), located on the same premises as the utility meter 80. In other embodiments the images may be sent to a server 51 through an internet gateway 53 over the internet 50. Although some systems using the image capture probe head 182 may be battery powered, many may provide an external power source due to the relatively high power consumption of the image capture device 185 and/or the image capture circuitry 186.

The image may be processed further and analyzed to determine an amount of the utility used. Techniques, such as optical character recognition (OCR), neural networks, and advanced image processing may be used. The processing of the image may take place in the probe head 182, the communication unit 130, the auxiliary device 301, the PC, the server 51, or any other device capable of performing the analysis. In many embodiments, the processing may be split among several entities with the probe head 182 and/or communication unit 130 performing operations requiring little processing power, and the more computational intensive tasks performed on the PC or server 51. Various standard and/or proprietary protocols may be used for communication between the server 51 and the auxiliary device 301 and/or the communication unit 130.

In some embodiments the probe head 182 and/or communication unit 130 may incorporate security features to help authenticate the images and minimize the possibility of a user substituting fraudulent images to the communication unit 130 to avoid proper metering and billing of the utility. In some embodiments a particular pixel or set of pixels may be checked to ensure that the RGB value of the pixel(s) matches the value when the probe head 182 was installed and verified. An image with improper pixel values may be rejected as invalid. In other embodiments, an icon, number, or other artifact may be etched on the lens of the image capture device 185. Each image can then be analyzed to ensure that the etched artifact is included in the image and is not distorted in any way that might indicate tampering. Another embodiment may embed a watermark in the image, which can be checked to ensure that any image is valid. If any image is invalidated during the process of determining the utility usage, the image can be discarded and a flag can be sent to the utility operator that a potentially fraudulent image was received.

Figure 9B:
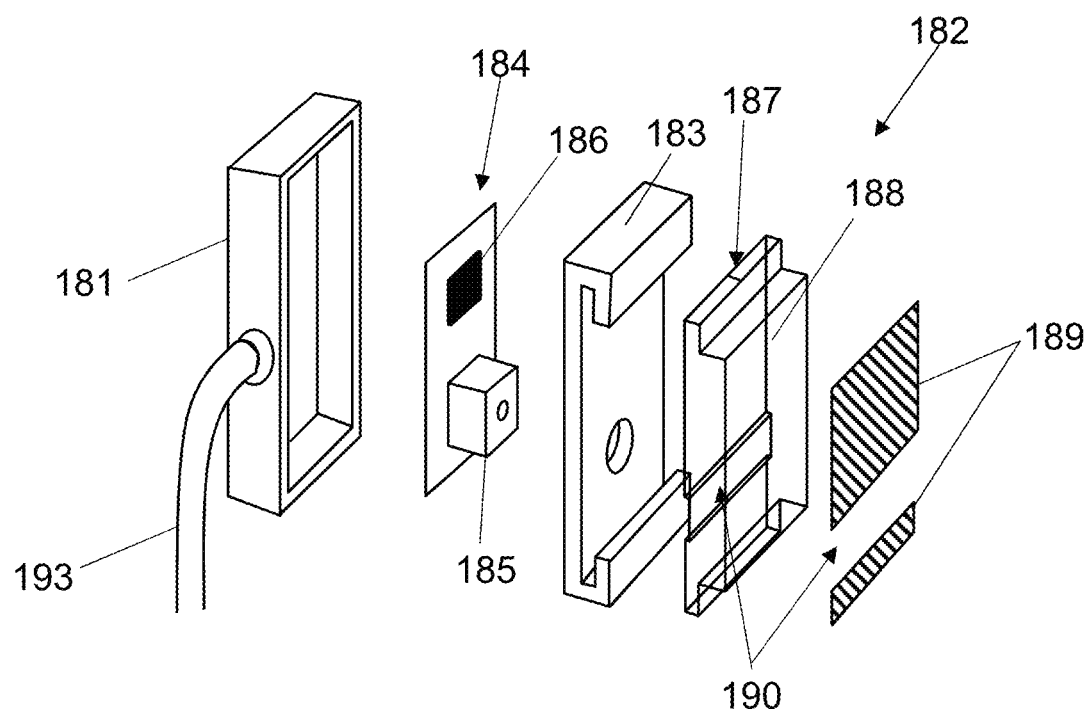
FIG. 9B shows an exploded view of an embodiment of an image capture probe head.

FIG. 9B is an exploded view of an embodiment of an image capture probe head 182. The probe head 182 may include the image capture device 185 and the image capture circuitry 186 on a printed circuit board 184 that may also include a connection (not shown) to the probe cable 193 and an indicator LED 191 (not shown). The printed circuit board 184 may be housed in a weatherproof plastic shell with a back shell 181 and a front shell 183. The front shell 183 may have an opening to allow the image capture device 185 to receive light.

A mounting bracket 188 may be included, along with adhesive pads 189 on the back of the mounting bracket 188. The mounting bracket 188 may be specifically designed for a particular meter or type of meter, or may be generic with a flat or curved adhesive side. A transparent window 190 may be included in the bracket 188 and adhesive pad 189 that may line up with the opening for the image capture device 185. The transparent window 190 may be a section of the bracket 188 made of clear plastic or glass, or it may be a cut-out section of the bracket 188. In some embodiments, the bracket 188 may be entirely made of a transparent material, such as a clear engineering plastic. The bracket 188 may be mounted on a utility meter in such a way that that the portion of the meter's display that is to be monitored is visible through the bracket 188. The thickness of the bracket 188 may be determined to ensure that the display of the meter is in the focus area of the image capture device 185 if the probe head is installed. In some embodiments, alignment marks or information may be included on the bracket 188 to assist in installation. Some embodiments may also include a template to assist in mounting the probe head 182 on a particular type of meter. The front shell 183 may have slots on the top and bottom that slide over tabs of the bracket 188 to ensure that the probe head 182 is properly aligned as it is installed on the bracket 188. An indentation 187 may be included on one of the tabs to engage with a feature in the slot of the front shell 183 to help position the probe head 182 on the bracket 188 and give tactile feedback to the user that the probe head 182 has been properly aligned.

Figure 9C:
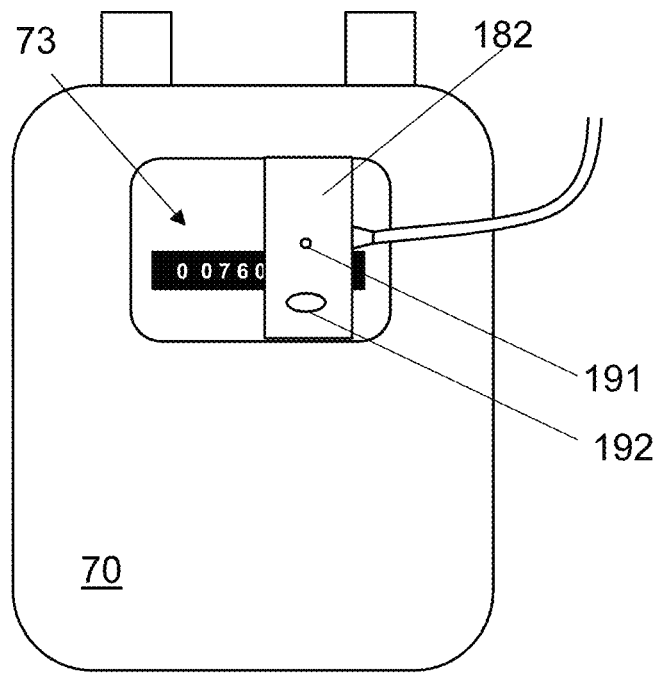
FIGS. 9C and 9D show the probe head of FIG. 9B mounted on a meter.
Figure 9D:
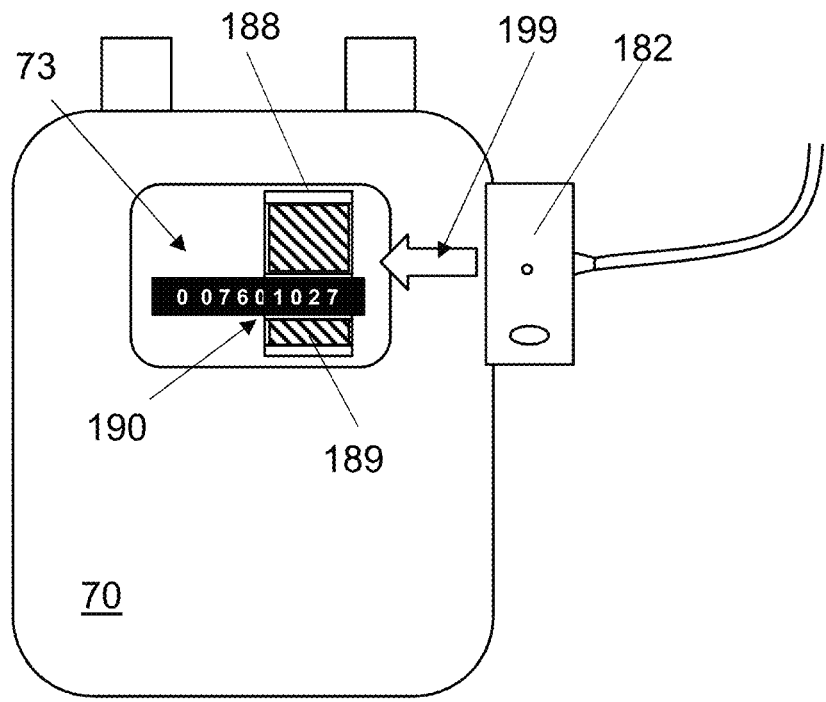

FIGS. 9C and 9D show the image capture probe head 182 of FIG. 9B mounted on a meter 70. While a gas meter 70 is shown, the techniques may be used with any type of meter. The meter 70 has a mechanical counter 73 for indicating a utility usage. An image capture probe head 182 may be mounted above a portion of the mechanical counter 73 to monitor the meter 70. A bracket mount 188 may be affixed to the meter 70 using an adhesive 189 or any other method of attachment. The bracket mount 188 may have a window 190 to allow the mechanical counter 73 to be viewed with the bracket 188 in place as shown in FIG. 9D. The probe head 182 may then attach to the bracket 188 by sliding 199 the slots of the probe head 182 over the tabs of the bracket 188 or by any other reversible attachment method. This may allow the probe head 182 to be easily removed to let a human meter reader examine the mechanical counter 73. The probe head 182 may then be easily reattached to the bracket 188 to be aligned to the mechanical counter 73 and the bracket 188 does not need to be removed to allow a human to examine the mechanical counter 73.

Figure 10:
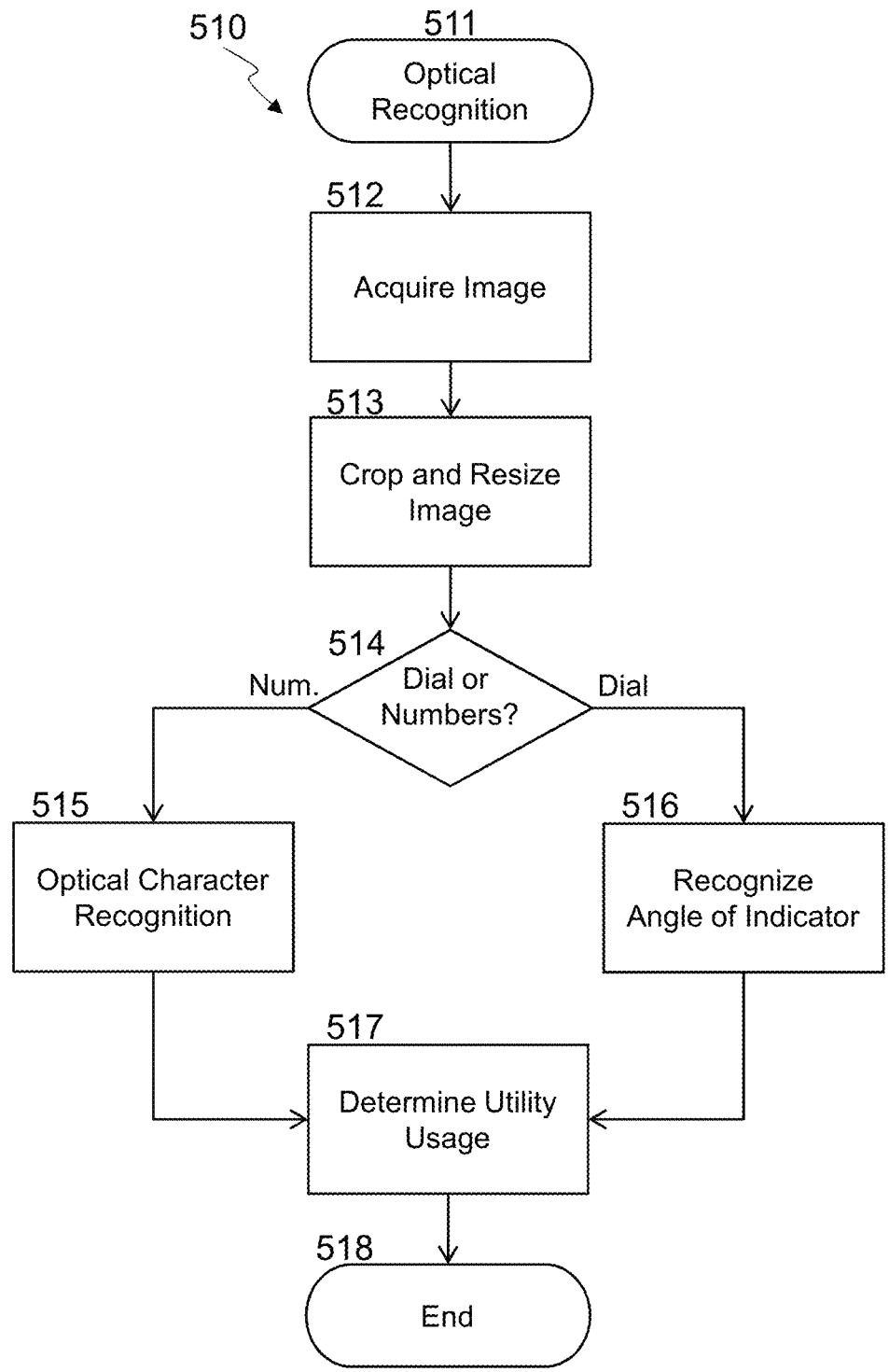
FIG. 10 is a flow chart for using a probe head that captures an image of the utility meter.

FIG. 10 is a flow chart 510 for using a probe head 182 that captures an image of the utility meter as shown in FIG. 9A. Optical recognition starts at block 511 and an image is acquired by the probe head 182 at block 512. Image acquisition may be triggered in various ways including motion detection, a timer, or a request by an external device sent to the communication unit 130. The image may be cropped and re-sized in block 513. This initial processing may take place in the probe head 182, the communication unit 130, the auxiliary unit 301, or other location. Depending on the embodiment, compression of the image may also be performed to reduce the amount of bandwidth required to send the image to other locations.

In at least one embodiment, the probe head 182 may perform little if any further processing on the image before passing it to the communication unit 130. The communication unit 130 may be paired with an auxiliary unit 301 and may send the image on to the auxiliary unit 301 without performing any image processing. The auxiliary unit 301 may add a time stamp to the image and perform basic image testing to ensure that the image is valid. The auxiliary unit 301 may crop and resize the image and compress the image before sending it over the internet 50 to the server 51. The remaining blocks of the method may be performed by any of the elements of the system shown in FIG. 9A or a local PC, but in at least one embodiment, may be performed by the remote server 51 after receiving the image. Many of the described blocks may require significant processing power and may be performed by the server 51 that may be specifically provisioned for the task.

At block 514 a determination may be made as to whether the image represents dials or number. One method of determining the type of image may be to pass the image through an OCR step to get a probability of proper OCR. If the probability from the OCR algorithm of a proper match is below a predetermined threshold, it may be assumed that the image is a dial. Some embodiments may support additional image types for different types of meter displays. If the image is determined to be numbers, the image may be sent through to an optical character recognition (OCR) block 515 where a numerical value may be extracted. OCR may perform a variety of image processing functions as is known in the art. If it is determined that the image is of one or more dials, various image processing functions may be used to extract an angle of the indicator at block 516. The angle of the indicator may be used to determine a numerical value of the dial. The various image processing techniques are well known in the art, but may include boundary determination to separate digits, erosion, dilation, radius calculations, centroid calculations, Laplacian filtering, noise reduction, edge enhancement, sharpening, unsharpening, and other techniques that may be useful. In some embodiments, both the current image and the previous image from the meter may be used to more accurately determine the current meter reading.

Once a numerical value has been determined for the image in block 515 or block 516, a utility usage is determined at block 517 before the method ends at block 518. In some embodiments, the entire meter reading may be captured in the image so the numerical value is the current meter reading. In other embodiments, only one or more of the least significant digits are determined from the image, and a history of previous meter reading may be used to determine the current meter reading. For example if the number extracted from the image is "012" and the previous reading was "988", it can be inferred that the correct meter reading is actually "1012". The meter may be monitored often enough to ensure that no digits are lost by a double roll over of the captured digits. In some embodiments, the server 51 may determine the times that the meter should be read, and send a message to the communication unit 130 to initiate an image capture. The server 51 may also request a new image capture if it is unable to determine a valid reading from an image.

The server 51 may store a history of meter readings for a particular utility meter. The history of readings may include the captured images that may be examined at a later time to audit or recalculate the meter readings. An audit reading of the meter may be determined using a different technique. The different technique may be use a different OCR algorithm that may be more reliable, but more time consuming, or it may utilize a human to analyze the images, or some other technique. The audit reading may be compared to the stored reading of the meter to determine a reliability of the automated meter reading method of FIG. 10. The history may also include the extracted meter readings, and may include usage information for the utility that may be the difference between the meter readings. The history may also include an indication as to whether the images of the utility meter are of digits or of dials. Such information may be used to allow the process of determining which type of display is being monitored to be skipped at the time that future images are received.

Figure 11A:
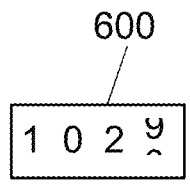
FIG. 11A is a representation of an image captured from a utility meter with a numerical display.

FIG. 11A is a representation of an image 600 of a utility meter with numerical display, such as mechanical counter 73. In other embodiments, a meter having an electronic display of digits, such as a light-emitting diode (LED) seven-segment display, or a liquid-crystal display (LCD) may be captured and processed. In some embodiments, such as the embodiment shown, a radix may be indicated (or implied) between the two leftmost digits. Image 600 shows the least significant four digits of the mechanical counter 73 that may have undergone some intermediate image processing. The image 600 may be ready to send to the OCR algorithm to extract an amount of utility used, which in the example shown may be about 102.94.

Figure 11B:
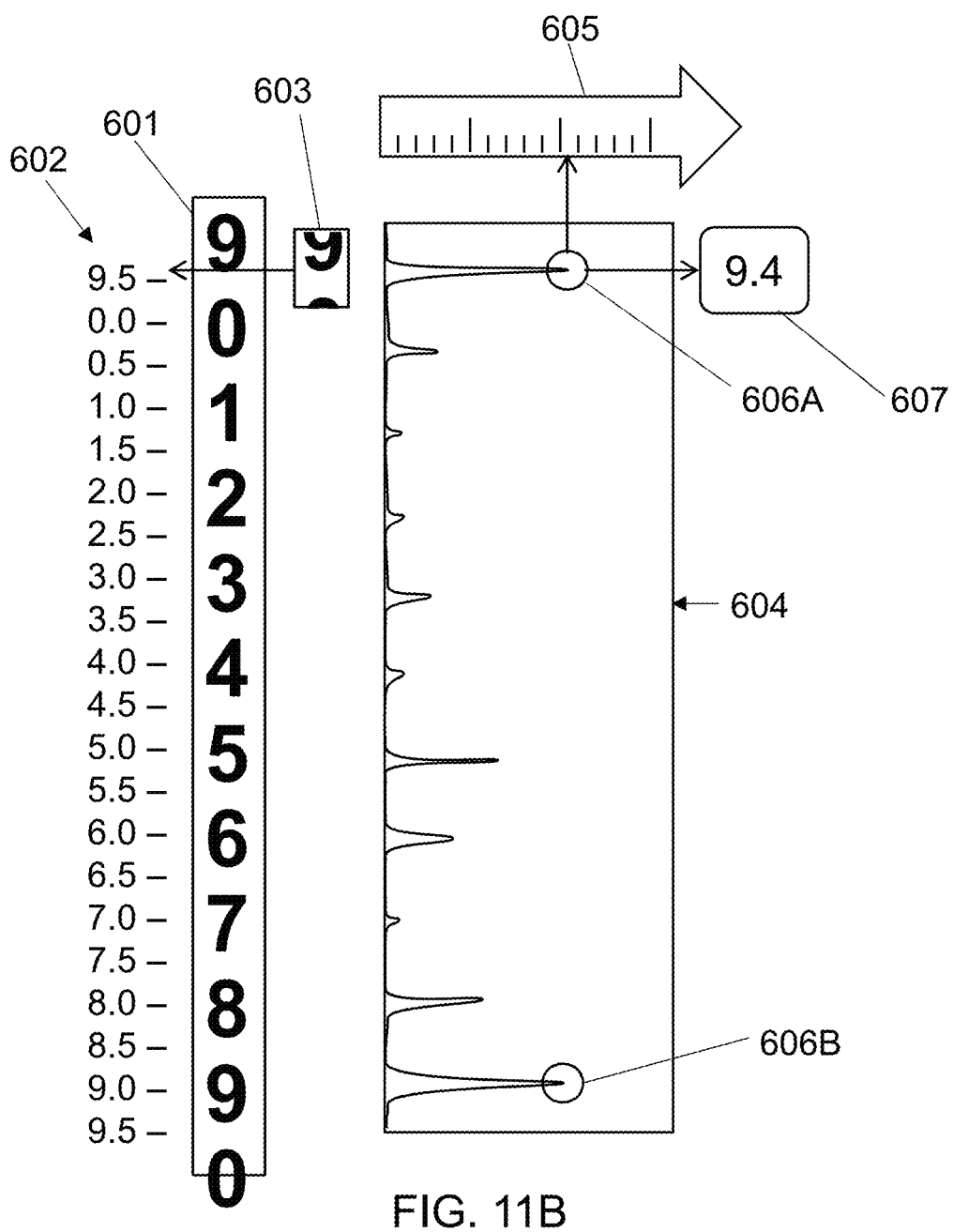
FIG. 11B shows a pictorial representation of using neural networks to recognize the meter display.

FIG. 11B shows a pictorial representation of using neural networks to recognize a mechanical counter wheel. An image of an "unrolled" digit of a mechanical counter wheel 601 is shown next to a map of values 602 of the counter wheel. An image 603 of a single digit of the mechanical counter may be captured and compared to the image of the unrolled wheel 601 to determine a correlation 604 of the extracted image 603 to various positions of the unrolled wheel 601. The correlation 604 may then be analyzed by finding the peak 606A/B with the highest reading on the correlation scale 605 to determine a best match value 607 of the current value of the counter wheel. Neural Network based comparative algorithms may be used to provide more precise readings. A history of the previous images may also be used to eliminate values that are not monotonically increasing over time.

Figure 11C:
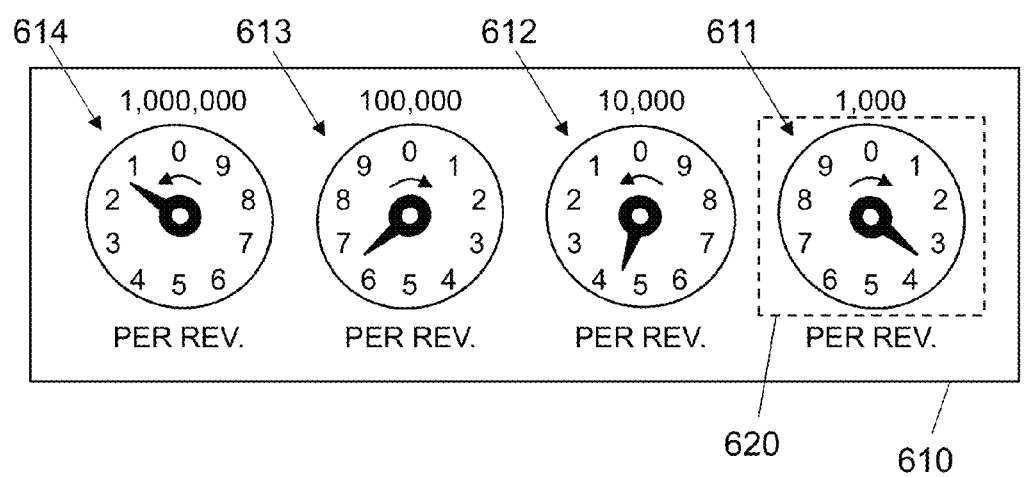
FIG. 11C shows an image of a dial type meter display.

FIG. 11C shows an image 610 of a dial type meter display with four significant digits represented by four dial indicators 611-614. The image 610 may be captured by a probe head with an image capture device. The image 610 may be filtered to enhance detail of the image for determining an angle of the indicator. In some embodiments, all the dials 611-614 of a meter may be captured in the image 610, but in other embodiments, only the least significant dial 611 may be captured, such as in the smaller image 620. Other embodiment may capture any one or more of the dials 611-614 in an image. Some utility meters having dials as a display may have some individual dials that rotate in the counter-clockwise direction, such as the 10,000 dial 612 and the 1,000,000 dial 614, and other dials that rotate in the clockwise direction, such as the 1,000 dial 611 and the 100,000 dial 613. Image processing techniques may determine locations for various numerical indications around a particular dial to determine the rotation of that dial.

Figure 12:
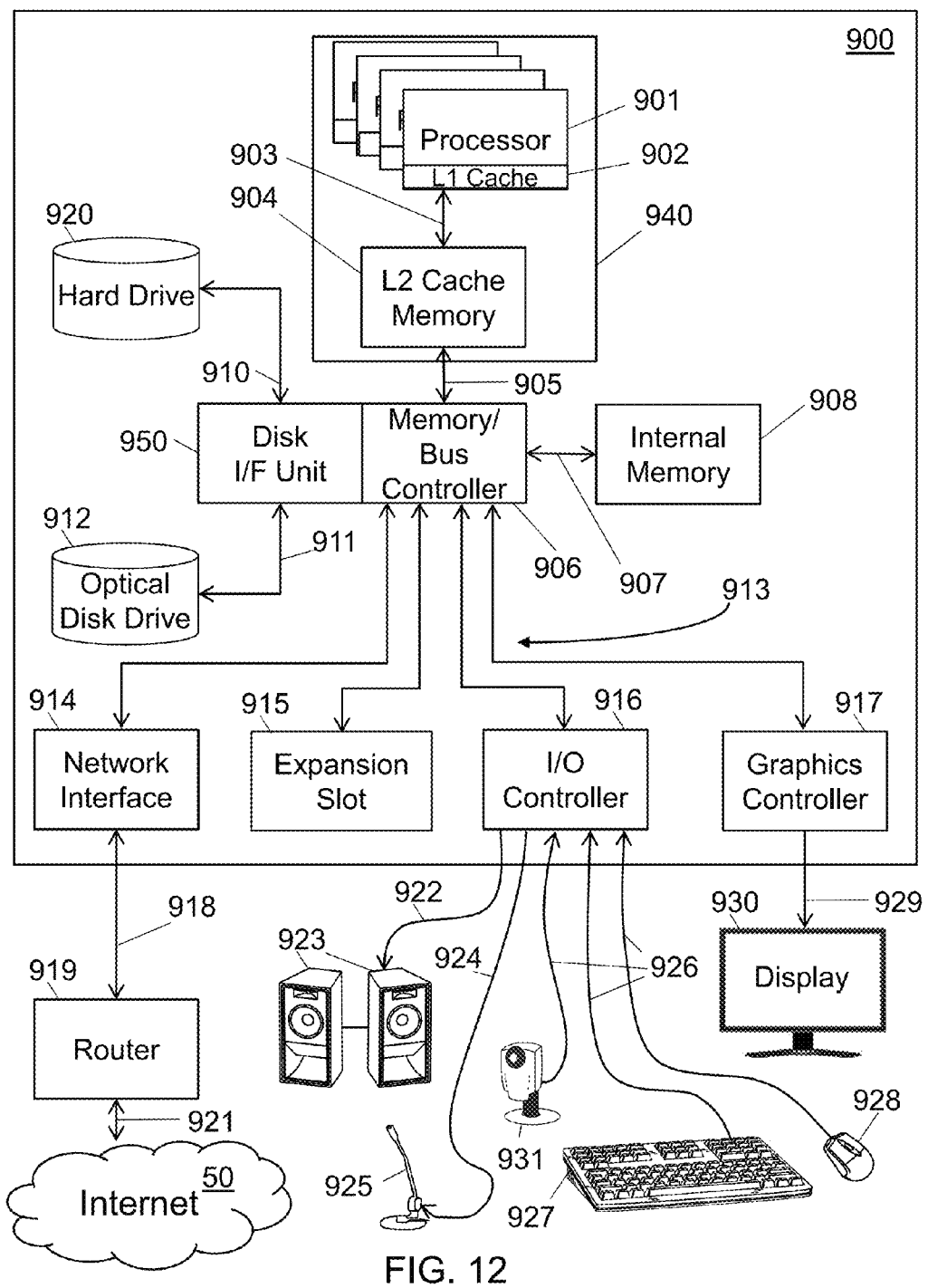
FIG. 12 is a computer system suitable for use in various embodiments.

FIG. 12 depicts details of a computer system 900 suitable for implementing various embodiments of the server 51 or other computer useful for various embodiments. The computer system 900 may be configured in the form of a desktop computer, a laptop computer, a mainframe computer, or any other hardware or logic arrangement capable of being programmed or configured to carry out instructions. In some embodiments the computer system 900 may act as a server, accepting inputs from a remote user over a local area network (LAN) 918 or the internet 50. In other embodiments, the computer system 900 may function as a smart user interface device for a server on a LAN 918 or over the internet 50. The computer system 900 may be located and interconnected in one location, or may be distributed in various locations and interconnected via communication links, such as a LAN 918 or a wide area network (WAN), via the Internet 50, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. One skilled in the art may recognize that many different architectures may be suitable for the computer system 900, but only one typical architecture is depicted in FIG. 12.

Computer system 900 may include a processor 901 which may be embodied as a microprocessor, two or more parallel processors, a central processing unit (CPU) or other such control logic or circuitry. The processor 901 may be configured to access a local cache memory 902, and send requests for data that are not found in the local cache memory 902 across a cache bus 903 to a second level cache memory 904. Some embodiments may integrate the processor 901, and the local cache 902 onto a single integrated circuit and other embodiments may utilize a single level cache memory or no cache memory at all. Other embodiments may integrate multiple processors 901 onto a single die and/or into a single package. Yet other embodiments may integrate multiple processors 901 with multiple local cache memories 902 and a second level cache memory 904 into a single package 940, with a front side bus 905 to communicate to a memory/bus controller 906. The memory/bus controller 906 may accept accesses from the processor(s) 901 and direct them to either the internal memory 908 over memory bus 907 or to the various input/output (I/O) busses 910, 911, 913. A disk interface unit 950 may connect to the communication link 910 to the hard disk drive 920 and/or or other communication link 911 to the optical disks 912, and may be integrated into the memory/bus controller 906 or may be a separate chip. Some embodiments of the computer system 900 may include multiple processor packages 940 sharing the front-side bus 905 to the memory/bus controller. Other embodiments may have multiple processor packages 940 with independent front-side bus connections to the memory/bus controller 906. The memory bus controller 906 may communicate with the internal memory 908 using a memory bus 907. The internal memory 908 may include one or more of random access memory (RAM) devices, such as synchronous dynamic random access memories (SDRAM), double data rate (DDR) memories, or other volatile random access memories. The internal memory 908 may also include non-volatile memories, such as electrically erasable/programmable read-only memory (EEPROM), NAND flash memory, NOR flash memory, programmable read-only memory (PROM), read-only memory (ROM), battery backed-up RAM, or other non-volatile memories. The various memory devices may be embodiments of a non-transitory computer readable storage medium suitable for storing computer program code and/or data. In some embodiments, the computer system 900 may also include 3rd level cache memory or a combination of these or other like types of circuitry configured to store information in a retrievable format. In some implementations the internal memory 908 may be configured as part of the processor 901, or alternatively, may be configured separate from it but within the same package 940. The processor 901 may be able to access internal memory 908 via a different bus or control lines than is used to access the other components of computer system 900.

The computer system 900 may also include, or have access to, one or more hard disk drives 920 (or other types of storage memory) and optical disk drives 912. Hard disk drives 920 and the optical disks for optical disk drives 912 are examples of non-transitory machine readable (also called computer readable) mediums suitable for storing computer program code and/or data. The optical disk drives 912 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 900 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable storage medium. The computer system 900 may either include the hard disk drives 920 and optical disk drives 912 as an integral part of the computer system 900 (e.g., within the same cabinet or enclosure and/or using the same power supply), as connected peripherals, or may access the hard disk drives 920 and optical disk drives 912 over a network, or a combination of these. The hard disk drive 920 often includes a rotating magnetic medium configured for the storage and retrieval of data, computer programs or other information. The hard disk drive 920 also often includes a disk controller capable of controlling the motor to rotate the storage medium as well as access the data on the medium. In some embodiments, an additional drive may be a solid state drive using semiconductor memories. In other embodiments, some other type of computer useable medium may be used. The hard disk drive 920 need not necessarily be contained within the computer system 900. For example, in some embodiments the hard disk drive 920 may be server storage space within a network that is accessible to the computer system 900 for the storage and retrieval of data, computer programs or other information. In some instances the computer system 900 may use storage space at a server storage farm, or like type of storage facility, that is accessible by the Internet 50 or other communications lines. The hard disk drive 920 is often used to store the software, instructions and programs executed by the computer system 900, including for example, all or parts of the computer application program for carrying out activities of the various embodiments.

The disk interface 910 and/or communication link 911 may be used to access the contents of the hard disk drives 920 and optical disk drives 912. These interfaces/links 910, 911 may be point-to-point links, such as Serial Advanced Technology Attachment (SATA) or a bus type connection, such as Parallel Advanced Technology Attachment (PATA) or Small Computer System Interface (SCSI), a daisy chained topology, such as IEEE-1394, a link supporting various topologies, such as Fibre Channel, or any other computer communication protocol, standard or proprietary, that may be used for communication to computer readable medium.

The memory/bus controller may also provide other I/O communication links 913. In some embodiments, the links 913 may be a shared bus architecture, such as peripheral component interface (PCI), microchannel, industry standard architecture (ISA) bus, extended industry standard architecture (EISA) bus, VERSAmodule Eurocard (VME) bus, or any other shared computer bus. In other embodiments, the links 913 may be a point-to-point link, such as PCI-Express, HyperTransport, or any other point-to-point I/O link. Various I/O devices may be configured as a part of the computer system 900. In many embodiments, a network interface 914 may be included to allow the computer system 900 to connect to a network 918. The network 918 may be an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A router 919 or network gateway, which may be a separate component from the computer system 900 or may be included as an integral part of the computer system 900, may be connected to the network 918 to allow the computer system 900 to communicate with the internet 50 over an internet connection 921, such as an asymmetric digital subscriber line (ADSL), data over cable service interface specification (DOCSIS) link, T1 or other internet connection mechanism. In other embodiments, the computer system 900 may have a direct connection to the internet 50. In some embodiments, an expansion slot 915 may be included to allow a user to add additional functionality to the computer system 900.

The computer system 900 may include an I/O controller 916 providing access to external communication interfaces, such as universal serial bus (USB) connections 926, serial ports, such as RS-232, parallel ports, audio in 924 and audio out 922 connections, the high performance serial bus IEEE-1394 and/or other communication links. These connections may also have separate circuitry in some embodiments, or may be connected through a bridge to another computer communication link provided by the I/O controller 916. A graphics controller 917 may also be provided to allow applications running on the processor 901 to display information to a user. The graphics controller 917 may output video through a video port 929 that may utilize a standard or proprietary format, such as an analog video graphic array (VGA) connection, a digital video interface (DVI), a digital high definition multimedia interface (HDMI) connection, or any other video interface. The video connection 929 may connect to display 930 to present the video information to the user. The display 930 may be any of several types of displays, including a liquid crystal display (LCD), a cathode ray tube (CRT) monitor, on organic light emitting diode (OLED) array, or other type of display suitable for displaying information for the user. The display 930 may include one or more light emitting diode (LED) indicator lights, or other such display devices. Typically, the computer system 900 includes one or more user input/output (I/O) devices, such as a keyboard 927, mouse 928, and/or other means of controlling the cursor represented including but not limited to a touchscreen, touchpad, joystick, trackball, tablet, or other device. The user I/O devices may connect to the computer system 900 using USB 926 interfaces or other connections, such as RS-232, PS/2 connector or other interfaces. Some embodiments may include a webcam 931 which may connect using USB 926, a microphone 925 connected to an audio input connection 924 and/or speakers 923 connected to an audio output connection 922. The keyboard 927 and mouse 928, speakers 923, microphone 925, webcam 931, and monitor 930 may be used in various combinations, or separately, as means for presenting information to the user and/or receiving information and other inputs from a user to be used in carrying out various programs and calculations. Speech recognition software may be used in conjunction with the microphone 925 to receive and interpret user speech commands.

As will be appreciated by those of ordinary skill in the art, aspects of the various embodiments may be embodied as a system, method or computer program product. Accordingly, aspects of ems may take the form of an entirely hardware embodiment, an entirely software embodiment (including firmware, resident software, micro-code, or the like) or an embodiment combining software and hardware aspects that may all generally be referred to herein as a "server," "circuit," "PC," "module," "auxiliary device," "logic" or "system." Furthermore, aspects of the various embodiments may take the form of a computer program product embodied in one or more computer readable medium(s) having computer readable program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language, such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Examples of various embodiments are described in the following paragraphs:

An example of a method to monitor utility meters may include detecting a characteristic of a first utility meter with a first probe head, communicating information related to the characteristic of the first utility meter from the first probe head to a communication unit, detecting a characteristic of a second utility meter with a second probe head, communicating information related to the characteristic of the second utility meter from the second probe head to the communication unit, and sending a message from the communication unit indicating the usage of the first utility or the usage of the second utility. The characteristic of the first utility meter is dependent on a usage of a first utility metered by the first utility meter, and the characteristic of the second utility meter is dependent on a usage of a second utility metered by the second utility meter. In some examples of the method, the communicating from the first probe head to the communication unit takes place over a first cable, the communicating from the second probe head to the communication unit takes place over a second cable, and the sending of the message takes place over a wireless network. In some examples of the method, the first cable and the second cable are no more than about 3 meters long. In some examples of the method, the first utility is electricity and the second utility is gas or water. In some examples of the method, the characteristic of the first utility meter is a first type of characteristic, and the characteristic of the second utility meter is a second type of characteristic that is different than the first type of characteristic. In some examples of the method, the characteristic of the first utility meter includes light pulses emitted by the first utility meter. In some examples of the method, the characteristic of the first utility meter includes light reflected by the first utility meter. In some examples of the method, the usage of the first utility is determined using neural network techniques on the amount of reflected light. In some examples of the method, the characteristic of the first utility meter includes a varying magnetic field of the first utility meter. In some examples of the method, the characteristic of the first utility meter includes an image of an indicator of the first utility meter. In some examples of the method, the usage of the first utility is determined using optical character recognition (OCR) on the image of the indicator of the first utility meter. Any combination of the examples of this paragraph may be used in embodiments.

An example machine readable medium may include one or more instructions that in response to being executed on a computing device cause the computing device to carry out a method according to any combination of the examples of the preceding paragraph.

An example apparatus to monitor one or more utility meters may include a communication unit including a processor, a communication interface coupled to the processor, and a probe interface coupled to the processor, and a meter monitoring probe including a probe head coupled by a cable to a probe connector capable to mate with the probe interface. The probe head is capable to detect a characteristic of a utility meter that is dependent on a usage of a utility metered, and send information related to the characteristic to the processor. The processor is capable to receive the information from the probe head and send a message related to the usage of the utility over the communication interface. In some examples of the apparatus, the probe head includes circuitry, such as an optical sensor, a light emitter with an optical sensor, a magnetic sensor, a Hall Effect sensor, an image sensor, an S0 connector, a P1 wired interface, an inductive clamp, or an ultrasonic flow sensor. In some examples of the apparatus, the communication unit is capable to support at least two different meter monitoring probes and the meter monitoring probe is replaceable. In some examples of the apparatus, the probe head includes a light emitter, a light detector and a magnetic sensor. In some examples of the apparatus, the light emitter and the light detector are contained in a first housing, the magnetic sensor is contained in a second housing, and the first housing is coupled to the second housing by a secondary cable. In some examples of the apparatus, the cable is no more than about 3 meters long. In some examples of the apparatus, the communication interface is capable to communicate over a wireless network. Some examples of the apparatus may also include an alignment template including a first section and a second section that is detachable from the first section. The alignment template may include one or more markings to align with one or more features of the utility meter, and at least two alignment marks located on the first section of the alignment template. The probe head may include at least two marks near edges of the probe head corresponding to the at least two alignment marks of the alignment template, and the probe head is attachable to the utility meter, after the second section of the alignment template is detached from the first section, with the at least two marks on the probe head matched to the at least two alignment marks on the first section of the alignment template, with the first section of the alignment template attached to the utility meter. In some examples of the apparatus, the at least two marks on the probe head include a first mark indicating a position of a component in the probe head on a first axis, and a second mark indicating a position of the component in the probe head on a second axis approximately perpendicular to the first axis. In some examples of the apparatus, the component is a light emitting component, a light detecting component, or a magnetic sensor. In some examples of the apparatus, the at least two marks on the probe head further include a third mark on an opposite edge of the probe head from the second mark, indicating the position of the component the second axis, and a fourth mark and a fifth mark on opposite edges of the probe head indicating a position of another component on the second axis, and the at least two alignment marks of the alignment template include five alignment marks corresponding to locations of the five marks on the probe head. In some examples of the apparatus, the probe head includes an image sensor, an indicator, and a button. The image sensor may be capable to capture an image in response to a press of the button. In some examples of the apparatus, the processor is capable to check the image and to indicate, with the indicator, whether the image sensor is positioned to capture a view of the utility meter useful to determine the usage of the utility. In some examples of the apparatus, the probe head includes a primary housing that contains circuitry to detect the characteristic of the utility meter, at least one flange protruding from the primary housing, and adhesive on the primary housing and the at least one flange to attach the probe head to the utility meter. In some examples of the apparatus, the probe head further includes a groove to facilitate removal of the at least one flange at a time of installation on the utility meter. In some examples of the apparatus, the probe head includes a primary housing that contains circuitry to detect the characteristic of the utility meter, and a mounting bracket to attach to the utility meter, and to hold the primary housing in a position to detect the characteristic of the utility meter. In some examples of the apparatus, the primary housing is attachable to and removable from the mounting bracket without using tools while the mounting bracket is attached to the utility meter, and the mounting bracket includes a window to allow a visual indication of a current reading of the utility meter to be visible if the primary housing is removed from the mounting bracket. In some examples of the apparatus, the probe head is capable to provide tactile feedback to a user as the primary housing is attached to the mounting bracket in the position to detect the characteristic of the utility meter. In some examples of the apparatus, the mounting bracket is shaped to fit a specific type of utility meter. In some examples of the apparatus, the probe head includes security features. In some examples of the apparatus, the security features include encryption based on a key that is associated to a particular probe head. In some examples of the apparatus, the security features are embedded in an image sent by the probe head. In some examples of the apparatus, the meter monitoring probe further includes a second probe head coupled by a second cable to the probe connector. The second probe head may be capable to detect a characteristic of a second utility meter that is dependent on a usage of a second utility metered, and send second information to the processor, and the processor may be capable to receive the second information from the second probe head and send a second message about the usage of the second utility over the communication interface. Some examples of the apparatus may also include a second probe interface coupled to the processor, and a second meter monitoring probe including a second probe head coupled by a second cable to a second probe connector capable to mate with the second probe interface. The second probe head may be capable to detect a characteristic of a second utility meter that is dependent on a usage of a second utility metered, and send second information to the processor, and the processor may be capable to receive the second information from the second probe head and send a second message about the usage of the second utility over the communication interface. Any combination of the examples of this paragraph may be used in embodiments.

An example system to monitor usage of one or more utilities may include any combination of the examples of the preceding paragraph, and a device capable to receive the message from the processor. Some example systems may also include a display. The device may be capable to show data related to the usage of the first utility on the display. In some example systems the device is capable to store data related to the usage of the first utility on a machine readable medium. In some example systems the message travels, at least in part, over the Internet. In some example systems the device is remotely located from the communication unit. Any combination of the examples of this paragraph may be used in embodiments.

An example system to monitor usage of one or more utilities may include an apparatus to monitor one or more utility meter and a device capable to receive the message from the processor. The apparatus may include a communication unit that includes a processor, a communication interface coupled to the processor, and a probe interface coupled to the processor, and a meter monitoring probe comprising a probe head coupled by a cable to a probe connector capable to mate with the probe interface. The probe head may be capable to detect a characteristic of a utility meter that is dependent on a usage of a utility metered, and send information related to the characteristic to the processor, and the processor may be capable to receive the information from the probe head and send a message related to the usage of the utility over the communication interface. The probe head may include an image sensor, an indicator, and a button. The image sensor may be capable to capture an image in response to a press of the button. The device may be capable to check the image received in the message from the processor, and send a message to the processor to control the indicator to indicate whether the image sensor is positioned to capture a view of the utility meter useful to determine the usage of the utility. In some examples of the system, the message travels, at least in part, over a wireless network. In some example systems the message travels, at least in part, over the Internet. In some example systems the device is remotely located from the communication unit. Any combination of the examples of this paragraph may be used in embodiments.

An example method to determine a reading of a utility meter may include acquiring an image of at least a portion of a display of the utility meter, performing optical character recognition (OCR) on at least a portion of the image, determining a probability of successful OCR, using a numerical output of the OCR to determine the reading of the utility meter if the probability of successful OCR is at least a predetermined value, and determining an angle of a dial indicator in at least the portion of the image if the probability of successful OCR is less than the predetermined value, and using the angle of the dial indicator to determine the reading of the utility meter. Some example methods may also include performing image processing on the image, which may include one or more of boundary determination, cropping, resizing, resampling, noise reduction, erosion, dilation, radius calculations, centroid calculations, laplacian filtering, noise reduction, edge enhancement, sharpening, or unsharpening. In some example methods the acquiring of the image is performed by a probe head, and the performing of OCR is performed by a processor that is remote from the probe head. In some example methods the acquiring of the image may include capturing an image of at least the portion of the display of the utility meter, and cropping and resizing the image before the performing of OCR. Some example methods may also include retrieving a previous reading of the utility meter, and using the previous reading in conjunction with the reading of the utility meter to determine an updated reading of the utility meter. The updated reading of the utility meter includes more digits that the reading of the utility meter. Some example methods may also include storing information indicating whether the numerical output of the OCR or the angle of the dial indicator was used for the determination of the reading of the utility meter, and using the stored information for additional determinations of the reading of the utility meter. Some example methods may also include storing the image and the reading of the utility meter, and determining an audit reading based of the stored image using a different technique, and checking the reading of the utility meter against the audit reading of the utility meter based on the stored image.

An example machine readable medium may include one or more instructions that in response to being executed on a computing device cause the computing device to carry out a method according to any combination of the examples of the preceding paragraph.

An example apparatus to monitor a utility meter may include circuitry to detect a characteristic of a utility meter that is dependent on a usage of a utility metered, a communication interface coupled to the circuitry to send information related to the characteristic to the processor, a housing that contains the circuitry to detect the characteristic of the utility meter, and a mounting bracket to attach to the utility meter, and to hold the housing in a position to detect the characteristic of the utility meter. The housing is attachable to and removable from the mounting bracket without using tools while the mounting bracket is attached to the utility meter, and the mounting bracket includes a window to allow a visual indication of a current reading of the utility meter to be visible if the primary housing is removed from the mounting bracket. In some example apparatus the circuitry may include an optical sensor, a light emitter with an optical sensor, a magnetic sensor, a Hall Effect sensor, or an image sensor. In some example apparatus the circuitry includes a light emitter, a light detector and a magnetic sensor. Some example apparatus may also include adhesive to attach the mounting bracket to the utility meter. In some example apparatus the housing is capable to provide tactile feedback to a user as the housing is attached to the mounting bracket in the position to detect the characteristic of the utility meter. In some example apparatus the mounting bracket is shaped to fit a specific type of utility meter. In some example apparatus the circuitry performs encryption based on a key that is associated to a particular apparatus. In some example apparatus the circuitry may include an image sensor, an indicator, and a button, and the image sensor may be capable to capture an image in response to a press of the button. In some example apparatus the circuitry may be capable to embed security features in the image.

As used in this specification and the appended claims, the singular forms "a", "an", and "the" include plural referents unless the content clearly dictates otherwise. Thus, for example, reference to an element described as "a device" may refer to a single device, two devices or any other number of devices. As used in this specification and the appended claims, the term "or" is generally employed in its sense including "and/or" unless the content clearly dictates otherwise.

As used herein, the term "coupled" includes direct and indirect connections. Moreover, where first and second devices are coupled, intervening devices including active devices may be located there between.

The description of the various embodiments provided above is illustrative in nature and is not intended to limit the claims, their application, or uses of the principles described herein. Thus, variations that are not described, yet conform with the language of the claims should be thought of as additional embodiments. Such variations are not to be regarded as a departure from the intended scope of the description provided herein.

What is claimed is:

1. An apparatus to monitor one or more utility meters comprising:
   a communication unit comprising a processor, a communication interface coupled to the processor, and a probe interface coupled to the processor; and
   a meter monitoring probe comprising a probe head coupled by a cable to a probe connector capable to mate with the probe interface;
   wherein the probe head comprises:
     an image sensor;
     an externally visible indicator; and
     a button;
   wherein the probe head is capable to detect a characteristic of a utility meter that is dependent on a usage of a utility metered, and send information related to the characteristic to the processor;
   the processor is capable to receive the information from the probe head and send a message related to the usage of the utility over the communication interface; and
   the image sensor is capable to capture an image in response to a press of the button.

2. The apparatus of claim 1, wherein the processor is capable to check the image and to indicate, with the externally visible indicator, whether the image sensor is positioned to capture a view of the utility meter useful to determine the usage of the utility.

3. The apparatus of claim 1, wherein the probe head comprises:
a primary housing that contains circuitry to detect the characteristic of the utility meter;
at least one flange protruding from the primary housing; and
adhesive on the primary housing and the at least one flange to attach the probe head to the utility meter.

4. The apparatus of claim 3, wherein the probe head further comprises:
a groove to facilitate removal of the at least one flange at a time of installation on the utility meter.

5. A system to monitor usage of one or more utilities comprising:
a communication unit comprising a processor, a communication interface coupled to the processor, and a probe interface coupled to the processor; and
a meter monitoring probe comprising a probe head coupled by a cable to a probe connector capable to mate with the probe interface; and
a device capable to receive the message from the processor;
wherein the probe head comprises:
an image sensor;
an indicator; and
a button;
wherein the probe head is capable to detect a characteristic of a utility meter that is dependent on a usage of a utility metered, and send information related to the characteristic to the processor;
the processor is capable to receive the information from the probe head and send a message related to the usage of the utility over the communication interface;
the image sensor is capable to capture an image in response to a press of the button; and
the device is capable to check the image received in the message from the processor, and send a message to the processor to control the indicator to indicate whether the image sensor is positioned to capture a view of the utility meter useful to determine the usage of the utility.

6. The system of claim 5, wherein the message travels, at least in part, over a wireless network.

7. The system of claim 5, wherein the message travels, at least in part, over the Internet.

8. The system of claim 5, wherein the device is remotely located from the communication unit.

9. A method to determine a reading of a utility meter comprising:
acquiring an image of at least a portion of a display of the utility meter;
performing optical character recognition (OCR) on at least a portion of the image;
determining a probability of successful OCR;
using a numerical output of the OCR to determine the reading of the utility meter if the probability of successful OCR is at least a predetermined value; and
determining an angle of a dial indicator in at least the portion of the image if the probability of successful OCR is less than the predetermined value, and using the angle of the dial indicator to determine the reading of the utility meter.

10. The method of claim 9, further comprising performing image processing on the image.

11. The method of claim 10, wherein the image processing comprises one or more of boundary determination, cropping, resizing, resampling, noise reduction, erosion, dilation, radius calculations, centroid calculations, laplacian filtering, noise reduction, edge enhancement, sharpening, or unsharpening.

12. The method of claim 9, wherein the acquiring of the image is performed by a probe head, and the performing of OCR is performed by a processor that is remote from the probe head.

13. The method of claim 9, wherein the acquiring of the image comprises:
capturing an image of at least the portion of the display of the utility meter;
cropping and resizing the image before the performing of OCR.

14. The method of claim 9, further comprising:
retrieving a previous reading of the utility meter; and
using the previous reading in conjunction with the reading of the utility meter to determine an updated reading of the utility meter;
wherein the updated reading of the utility meter includes more digits that the reading of the utility meter.

15. The method of claim 9, further comprising:
storing information indicating whether the numerical output of the OCR or the angle of the dial indicator was used for the determination of the reading of the utility meter; and
using the stored information for additional determinations of the reading of the utility meter.

16. The method of claim 9, further comprising:
storing the image and the reading of the utility meter; and
determining an audit reading based of the stored image using a different technique;
checking the reading of the utility meter against the audit reading of the utility meter based on the stored image.

17. At least one non-transitory machine readable medium having one or more instructions stored thereon, that in response to being executed on a computing device cause the computing device to carry out a method comprising:
acquiring an image of at least a portion of a display of the utility meter;
performing optical character recognition (OCR) on at least a portion of the image;
determining a probability of successful OCR;
using a numerical output of the OCR to determine the reading of the utility meter if the probability of successful OCR is at least a predetermined value; and
determining an angle of a dial indicator in at least the portion of the image if the probability of successful OCR is less than the predetermined value, and using the angle of the dial indicator to determine the reading of the utility meter.

18. The at least one non-transitory machine readable medium of claim 17, the method further comprising performing image processing on the image.

19. The at least one non-transitory machine readable medium of claim 18, wherein the image processing comprises one or more of boundary determination, cropping, resizing, resampling, noise reduction, erosion, dilation, radius calculations, centroid calculations, laplacian filtering, noise reduction, edge enhancement, sharpening, or unsharpening.

20. The at least one non-transitory machine readable medium of claim 17, wherein the acquiring of the image is performed by a probe head, and the performing of OCR is performed by a processor that is remote from the probe head.

21. The at least one non-transitory machine readable medium of claim 17, wherein the acquiring of the image comprises:

capturing an image of at least the portion of the display of the utility meter;
cropping and resizing the image before the performing of OCR.

22. The at least one non-transitory machine readable medium of claim 17, the method further comprising:
retrieving a previous reading of the utility meter; and
using the previous reading in conjunction with the reading of the utility meter to determine an updated reading of the utility meter;
wherein the updated reading of the utility meter includes more digits that the reading of the utility meter.

23. The at least one non-transitory machine readable medium of claim 17, the method further comprising:
storing information indicating whether the numerical output of the OCR or the angle of the dial indicator was used for the determination of the reading of the utility meter; and
using the stored information for additional determinations of the reading of the utility meter.

24. The at least one non-transitory machine readable medium of claim 17, the method further comprising:
storing the image and the reading of the utility meter; and
determining an audit reading based of the stored image using a different technique;
checking the reading of the utility meter against the audit reading of the utility meter based on the stored image.

* * * * *